US012664970B2

(12) United States Patent
Wang et al.

(10) Patent No.: US 12,664,970 B2
(45) Date of Patent: Jun. 23, 2026

(54) SPEECH TRANSLATION WITH PERFORMANCE CHARACTERISTICS

(71) Applicant: Amazon Technologies, Inc., Seattle, WA (US)

(72) Inventors: Duo Wang, Cambridge (GB); Vincent Laurent J. Pollet, Astene (BE); Mikolaj Wojciech Babianski, Gdansk (PL); Jakub Bartlomiej Swiatkowski, Warsaw (PL)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 18/193,349

(22) Filed: Mar. 30, 2023

(65) Prior Publication Data

US 2024/0274122 A1 Aug. 15, 2024

Related U.S. Application Data

(60) Provisional application No. 63/444,312, filed on Feb. 9, 2023.

(51) Int. Cl.
G06V 10/82 (2022.01)
G06F 40/58 (2020.01)
(Continued)

(52) U.S. Cl.
CPC ............ G10L 13/086 (2013.01); G10L 15/16 (2013.01); G10L 25/63 (2013.01); H04N 21/8106 (2013.01)

(58) Field of Classification Search
CPC ....... G10L 13/086; G10L 15/16; G10L 25/63; G10L 13/047; G10L 13/033;
(Continued)

(56) References Cited

U.S. PATENT DOCUMENTS 11,514,885 B2 11/2022 Gabryjelski et al.
11,545,134 B1 1/2023 Federico et al.
(Continued)

OTHER PUBLICATIONS

An et al., Disentangling Style and Speaker Attributes for TTS Style Transfer, arXiv:2201.09472v1 (Year: 2022).*
(Continued)

*Primary Examiner* — Pierre Louis Desir
*Assistant Examiner* — Cody Douglas Hutcheson
(74) *Attorney, Agent, or Firm* — Pierce Atwood LLP

(57) ABSTRACT

An expressive speech translation system may process source speech in a source language and output synthesized speech in a target language while retaining vocal performance characteristics such as intonation, emphasis, rhythm, style, and/or emotion. The system may receive a transcript of the source speech, translate it, and generate transcript data. To generate the synthesized speech, the system may process the transcript data with a language embedding representing language-dependent speech characteristics of the target language, a speaker embedding representing speaker-dependent voice identity characteristics of a speaker, and a performance embedding representing the vocal performance characteristics of the source speech. The system may control the duration of segments of the synthesized speech to better align with corresponding segments of the source speech for the purpose of dubbing multimedia content with synthesized speech in a language different from that of the original audio.

20 Claims, 16 Drawing Sheets

(51) Int. Cl.

| | | |
|---|---|---|
| *G10L 13/033* | (2013.01) | |
| *G10L 13/08* | (2013.01) | |
| *G10L 15/16* | (2006.01) | |
| *G10L 25/63* | (2013.01) | |
| *H04N 21/81* | (2011.01) | |

(58) Field of Classification Search
CPC .. H04N 21/8106; G06V 10/82; G06V 40/174;
G06F 40/58
See application file for complete search history.

(56) References Cited

U.S. PATENT DOCUMENTS

| | | | | |
|---|---|---|---|---|
| 12,233,338 | B1 * | 2/2025 | Zhong | G10L 17/18 |
| 2020/0066253 | A1 * | 2/2020 | Peng | G06N 3/045 |
| 2020/0342852 | A1 * | 10/2020 | Kim | G06F 40/40 |
| 2021/0224319 | A1 | 7/2021 | Ingel et al. | |
| 2022/0059076 | A1 * | 2/2022 | Gao | G10L 15/26 |
| 2022/0189456 | A1 * | 6/2022 | Pang | G10L 21/007 |
| 2023/0124111 | A1 | 4/2023 | Seo et al. | |
| 2023/0343319 | A1 * | 10/2023 | Hu | G06N 3/0442 |
| 2024/0038212 | A1 * | 2/2024 | Shih | G10L 13/08 |
| 2024/0038271 | A1 * | 2/2024 | de Juan | G06V 40/50 |
| 2024/0105207 | A1 * | 3/2024 | Kruk | G10L 25/63 |
| 2024/0185874 | A1 * | 6/2024 | Shah | G10L 25/63 |
| 2024/0404505 | A1 * | 12/2024 | Nguyen | G06N 3/0475 |

OTHER PUBLICATIONS

U.S. Appl. No. 18/128,766, filed Mar. 30, 2023.
Coile, et al., "Protran: A prosody transplantation tool for text-to-speech applications.," Proceedings of ICSLP, IEEE, 1994.
Skerry-Ryan, et al., "Towards End-to-End Prosody Transfer for Expressive Speech Synthesis with Tacotron," International Conference on Machine Learning, PMLR, 2018, pp. 4693-4702.
Kim, et al., "Conditional variational autoencoder with adversarial learning for end-to-end text-to-speech," International Conference on Machine Learning, PMLR, 2021, pp. 5530-5540.
Tan, et al., "NaturalSpeech: End-to-End Text to Speech Synthesis with Human-Level Quality," arXiv preprint arXiv:2205.04421, 2022.

Jia, et al., "CVSS corpus and massively multilingual speech-to-speech translation," Proceedings of Language Resources and Evaluation Conference (LREC), 2022, pp. 6691-6703.
Wang, et al., "Style tokens: Unsupervised style modeling, control and transfer in end-to-end speech synthesis," International Conference on Machine Learning, PMLR, 2018, pp. 5180-5189.
Zhang, et al., "Learning latent representations for style control and transfer in end-to-end speech synthesis," IEEE International Conference on Acoustics, Speech and Signal Processing (ICASSP), IEEE, 2019, pp. 6945-6949.
Torresquintero, et al., "ADEPT: A Dataset for Evaluating Prosody Transfer," Proc. Interspeech, 2021, pp. 3880-3884.
Mitsui, et al., "End-to-End Text-to-Speech based on latent representation of speaking styles using spontaneous dialogue," Proc. Interspeech, 2022, pp. 2328-2332.
Zhang, et al., "DenoiSpeech: Denoising text to speech with frame-level noise modeling," IEEE International Conference on Acoustics, Speech and Signal Processing (ICASSP), IEEE, 2021, pp. 7063-7067.
Saeki, et al., "DRSpeech: Degradation-Robust Text-to-Speech Synthesis with Frame-Level and Utterance-Level Acoustic Representation Learning," Proc. Interspeech, 2022, pp. 793-797.
Zhang, et al., "VISinger: Variational inference with adversarial learning for end-to-end singing voice synthesis," IEEE International Conference on Acoustics, Speech and Signal Processing (ICASSP), IEEE, 2022, pp. 7237-7241.
Cho, et al., "SANE-TTS: Stable and Natural End-to-End Multilingual Text-to-Speech," Proc. Interspeech, 2022, pp. 1-5.
Kong, et al., "Hifigan: Generative adversarial networks for efficient and high fidelity speech synthesis," Advances in Neural Information Processing Systems, vol. 33, pp. 17022-17033, 2020.
Lee, et al., "BigVGAN: A Universal Neural Vocoder with Large-Scale Training," arXiv preprint arXiv:2206.04658, 2022.
Isik, et al., "PoCoNet: Better speech enhancement with frequency-positional embeddings, semi-supervised conversational data, and biased loss," Interspeech, 2020.
International Search Report and Written Opinion mailed on Apr. 15, 2024 for International Patent Application No. PCT/US2024/012368, filed Jan. 22, 2024.
U.S. Office Action issued on Jun. 27, 2025 for U.S. Appl. No. 18/128,766, filed Mar. 30, 2023.

* cited by examiner

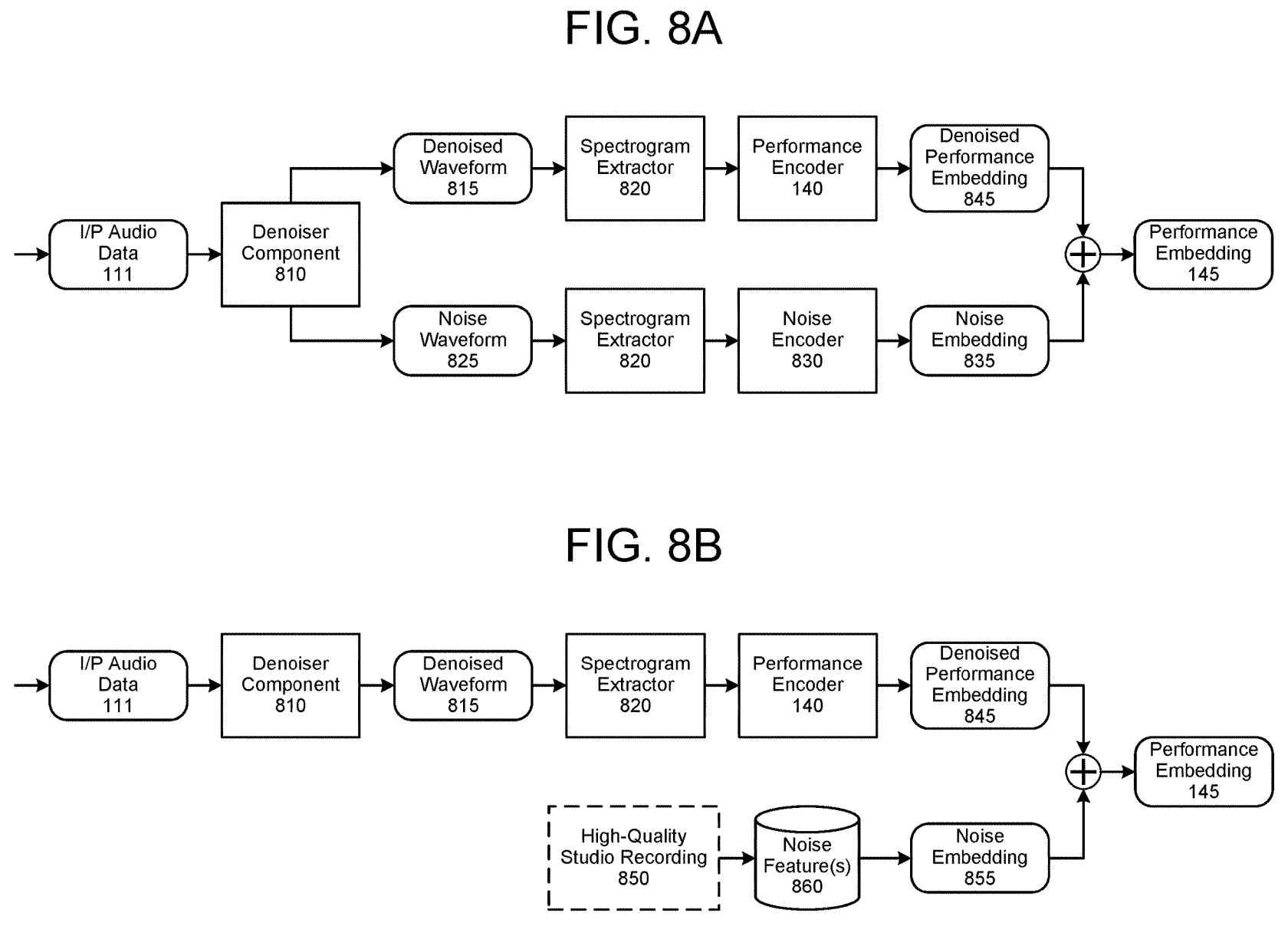

I/P Audio Data 111 → Denoiser Component 810

Denoiser Component 810 → Denoised Waveform 815 → Spectrogram Extractor 820 → Performance Encoder 140 → Denoised Performance Embedding 845

Denoiser Component 810 → Noise Waveform 825 → Spectrogram Extractor 820 → Noise Encoder 830 → Noise Embedding 835

Denoised Performance Embedding 845 + Noise Embedding 835 → Performance Embedding 145

FIG. 8B

I/P Audio Data 111 → Denoiser Component 810 → Denoised Waveform 815 → Spectrogram Extractor 820 → Performance Encoder 140 → Denoised Performance Embedding 845

High-Quality Studio Recording 850 → Noise Feature(s) 860 → Noise Embedding 855

Denoised Performance Embedding 845 + Noise Embedding 855 → Performance Embedding 145

Figure 10B:
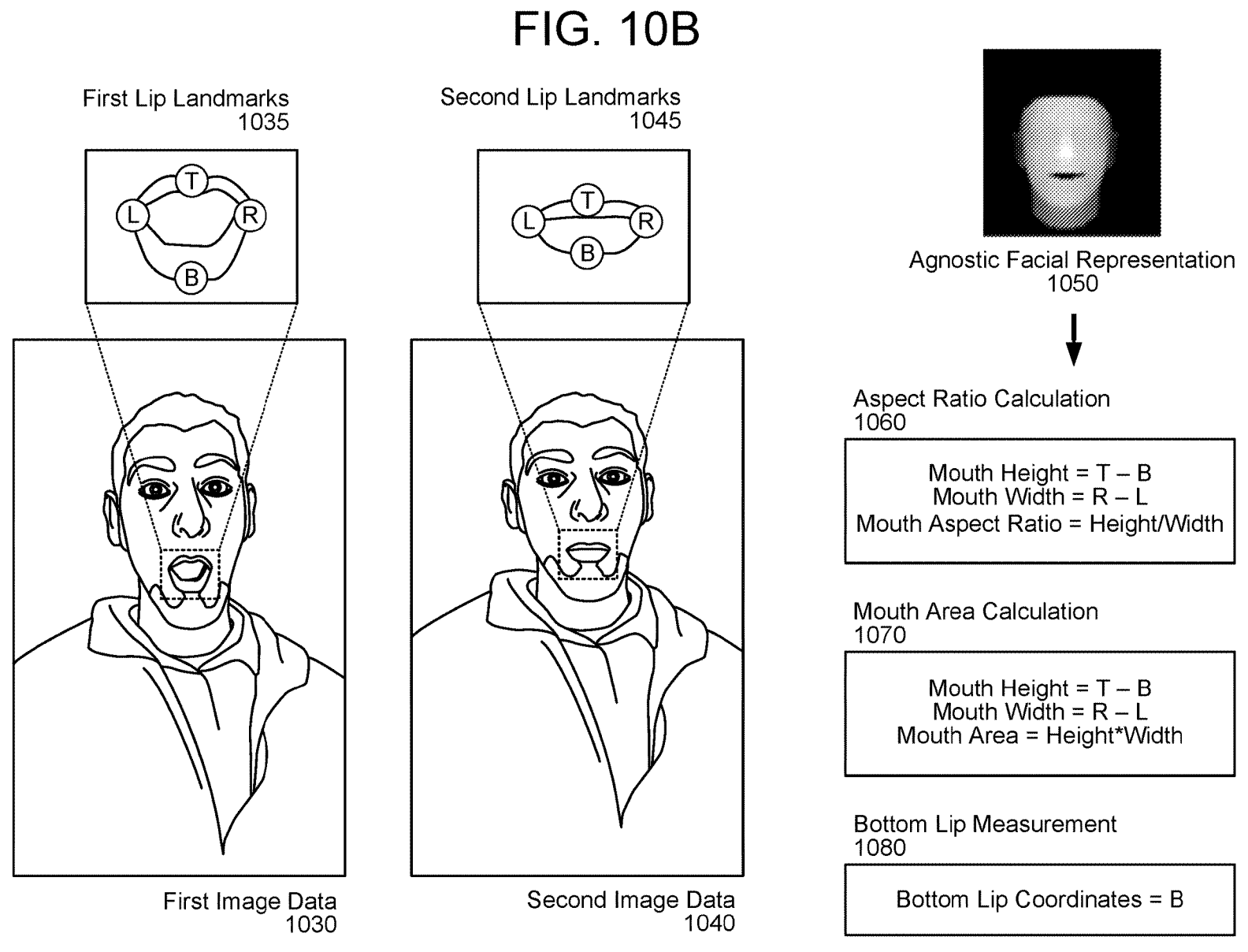

Agnostic Facial Representation
1050

Aspect Ratio Calculation
1060

Mouth Height = T – B
Mouth Width = R – L
Mouth Aspect Ratio = Height/Width

Mouth Area Calculation
1070

Mouth Height = T – B
Mouth Width = R – L
Mouth Area = Height*Width

Bottom Lip Measurement
1080

Bottom Lip Coordinates = B

Second Lip Landmarks 1045

Second Image Data
1040

First Lip Landmarks 1035

First Image Data
1030

Figure 13:
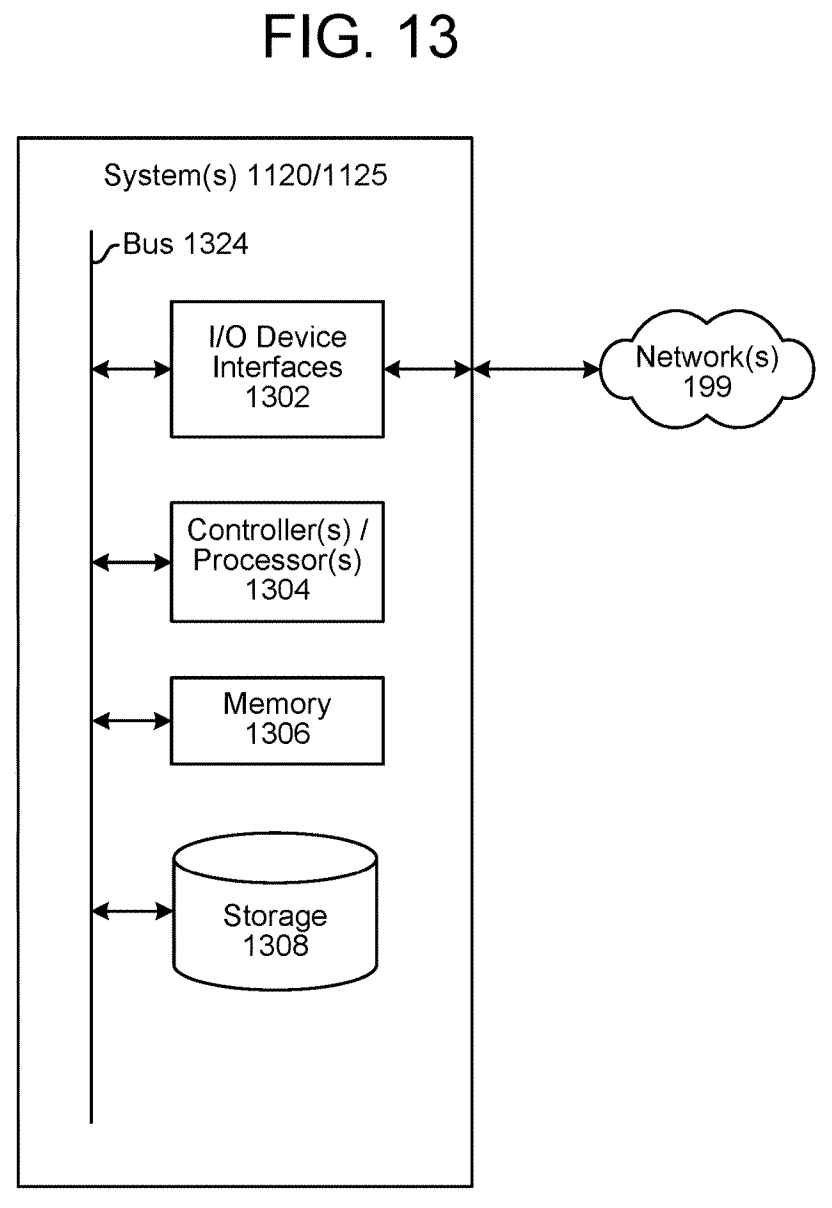

System(s) 1120/1125

Bus 1324

I/O Device Interfaces 1302

Controller(s) / Processor(s) 1304

Memory 1306

Storage 1308

Network(s) 199

SPEECH TRANSLATION WITH PERFORMANCE CHARACTERISTICS

CROSS-REFERENCE TO RELATED APPLICATION

This application claims the benefit of priority under 35 U.S.C. § 119(e) of U.S. Provisional Patent Application No. 63/444,312, filed Feb. 9, 2023, and entitled "TEXT-TO-SPEECH (TTS) PROCESSING", the entire contents of which is incorporated herein by reference for all purposes.

BACKGROUND

Speech processing and generation systems have progressed to the point where humans can interact with computing devices using voice input and synthesized speech output. Such systems employ speech recognition techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech generation may involve synthesizing speech based on source text or other data representing natural language.

Speech processing and generation may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram of the expressive speech translation system in further detail, according to embodiments of the present disclosure.

FIG. 6 is a conceptual diagram illustrating details of a flow model configured to add or suppress voice identity characteristics of a speaker, according to embodiments of the present disclosure.

FIGS. 8A and 8B illustrate an example technique for reducing the effect of noise when capturing vocal performance characteristics of the source speech, according to embodiments of the present disclosure.

FIG. 9 is a conceptual diagram of an ASR component, according to embodiments of the present disclosure.

FIG. 10B is a conceptual diagram illustrating examples of performing facial measurements and calculating aspect ratios, according to embodiments of the present disclosure.

FIG. 11 is a conceptual diagram of the system including components for processing natural language commands, according to embodiments of the present disclosure.

FIG. 13 is a block diagram conceptually illustrating example components of a system, according to embodiments of the present disclosure.

DETAILED DESCRIPTION

Figure 1A:
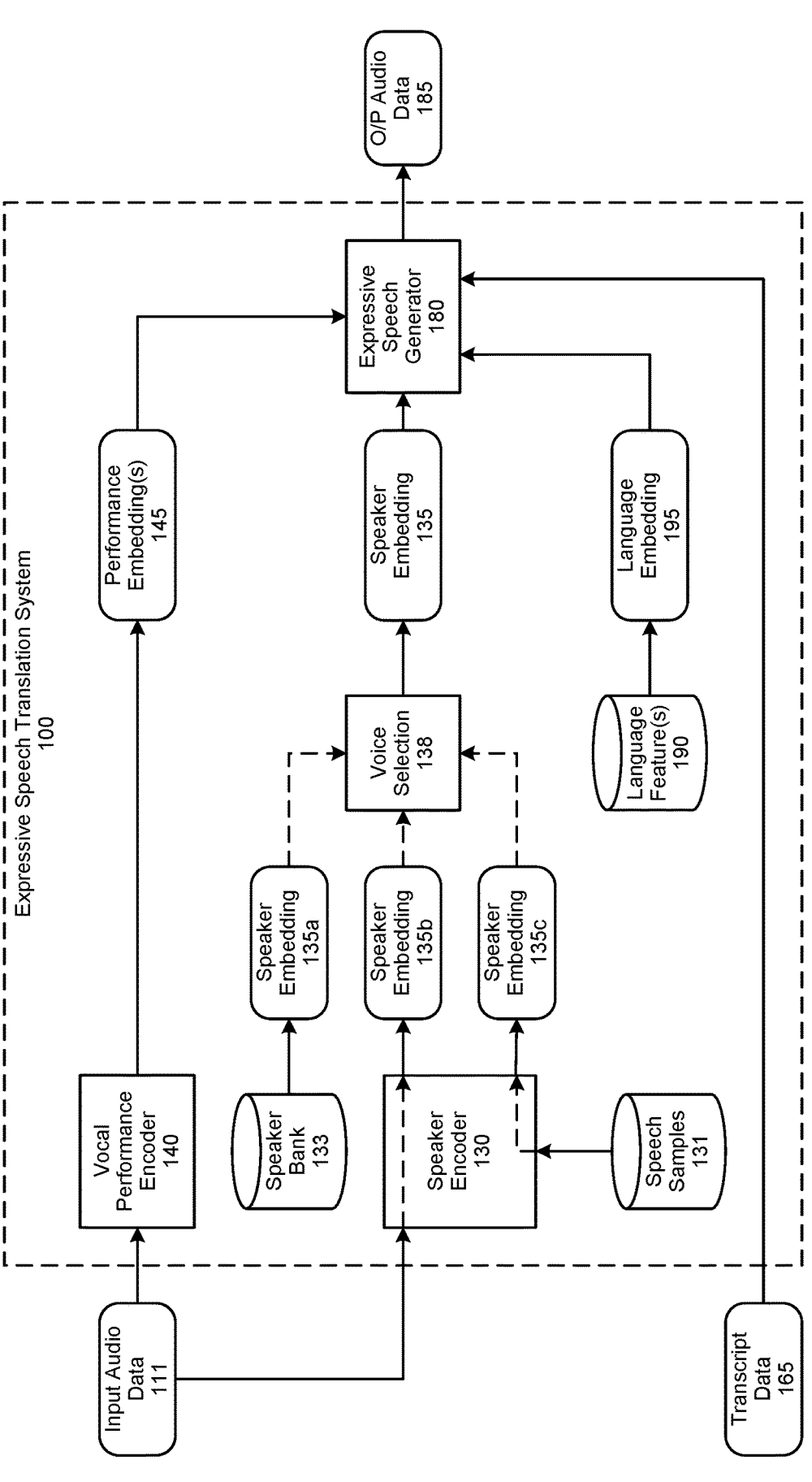
FIG. 1A is a conceptual diagram of an expressive speech translation system, according to embodiments of the present disclosure.

Automatic speech recognition (ASR) is a field of computer science, artificial intelligence, and linguistics concerned with transforming audio data associated with speech into text (or other data representing text) representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Neural Machine Translation (NMT) is a field of computer science, artificial intelligence, and linguistics concerned with translating natural language from a first spoken and/or written language to a second language. Text-to-speech (TTS) is a field of computer science concerning transforming textual and/or other data into audio data that is synthesized to resemble human speech. ASR, NLU, NLG, NMT, and/or TTS may be used together as part of a speech-processing system that can communicate with a user by processing spoken inputs and responding with synthesized speech. A speech-processing system may additionally receive other inputs and provide other outputs.

A speech-processing system may be configured to combine speech processing, machine translation, and speech generation techniques to translate speech from a source language to a target language. Such a speech translation system may be useful for translating voice messages (e.g., voice comments, voice mails, etc.), television shows, movies, audio books, podcasts, etc. Speech often includes expressive and/or other performance characteristics such as emphasis, emotion, intensity, etc. Reproducing the vocal performance characteristics of the source speech in the synthesized speech may improve the intelligibility and/or entertainment value of the synthesized speech.

Offered herein are techniques for reproducing the expressive characteristics of source speech when generating synthesized speech in a different language. The expressive speech translation system may include various models (e.g., machine learning models) that may be configured and/or trained to separate, or "disentangle", various characteristics of speech. For example, the system may be trained to differentiate which speech features (e.g., acoustic features) may correspond to a particular language, which may correspond to a particular speaker, and which may vary based on expression. The expressive aspects of speech may include prosodic features such as intonation, stress/emphasis, rhythm, and/or style. These vocal performance features may be reflected in the energy envelope, pitch envelope, phoneme durations, pause durations, etc. In some implementations, performance features may be encoded and reproduced together (e.g., by a vocal performance encoder machine learning model); that is, without necessarily quantifying the individual features separately. By encoding the performance features together, the system may generate its own latent representations in a manner that allows it to more accurately reproduce the vocal performance characteristics of speech samples in a training dataset.

In some implementations, the system may include components for adjusting the durations of phonemes, syllables, words, phrases, etc., of the synthesized speech to the corresponding durations of the source speech. The system may be used to perform dubbing of multimedia content such as movies or television shows. Dubbing may refer to the act or process of creating new audio for media content, where the new audio may include a translation of speech from the original audio (and, in some cases, non-speech vocalizations). Because such multimedia content may show the speakers (e.g., actors, performers, anchors, animated characters, etc.), synchronizing the output audio to the source audio such that the synthesized speech occurs when the speaker's mouth is moving may improve the viewing experience. The processes of synchronizing the synthesized speech to the source speech may be referred to as duration imposition, and synthesized speech that is synchronized to the source speech may be said to be isochronous.

In some implementations, the system may include additional features for suppressing the effect of noise. In some cases, the source speech may include background noise such as room effects like reverberation and echo, other voices, sounds from appliances or traffic, a film score, sound effects, non-speech vocalization by the speaker (e.g., laughing, crying, grunting, etc.), and/or other audio atmospherics from media content. Thus, the component used to extract the expressive aspects of the source speech (e.g., a vocal performance encoder) may be trained in conjunction with a denoising component and a noise encoder to extract and encode the noise features and the expressive aspects of the source speech separately. When performing translation and/or speaker voice replacement, noise extracted from the input audio may be discarded, and the expressive aspects encoded with noise features extracted from a high-quality audio recording made in a low-noise environment such as a sound studio.

These and other features of the system may be used alone or in various combinations as described herein. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1B:
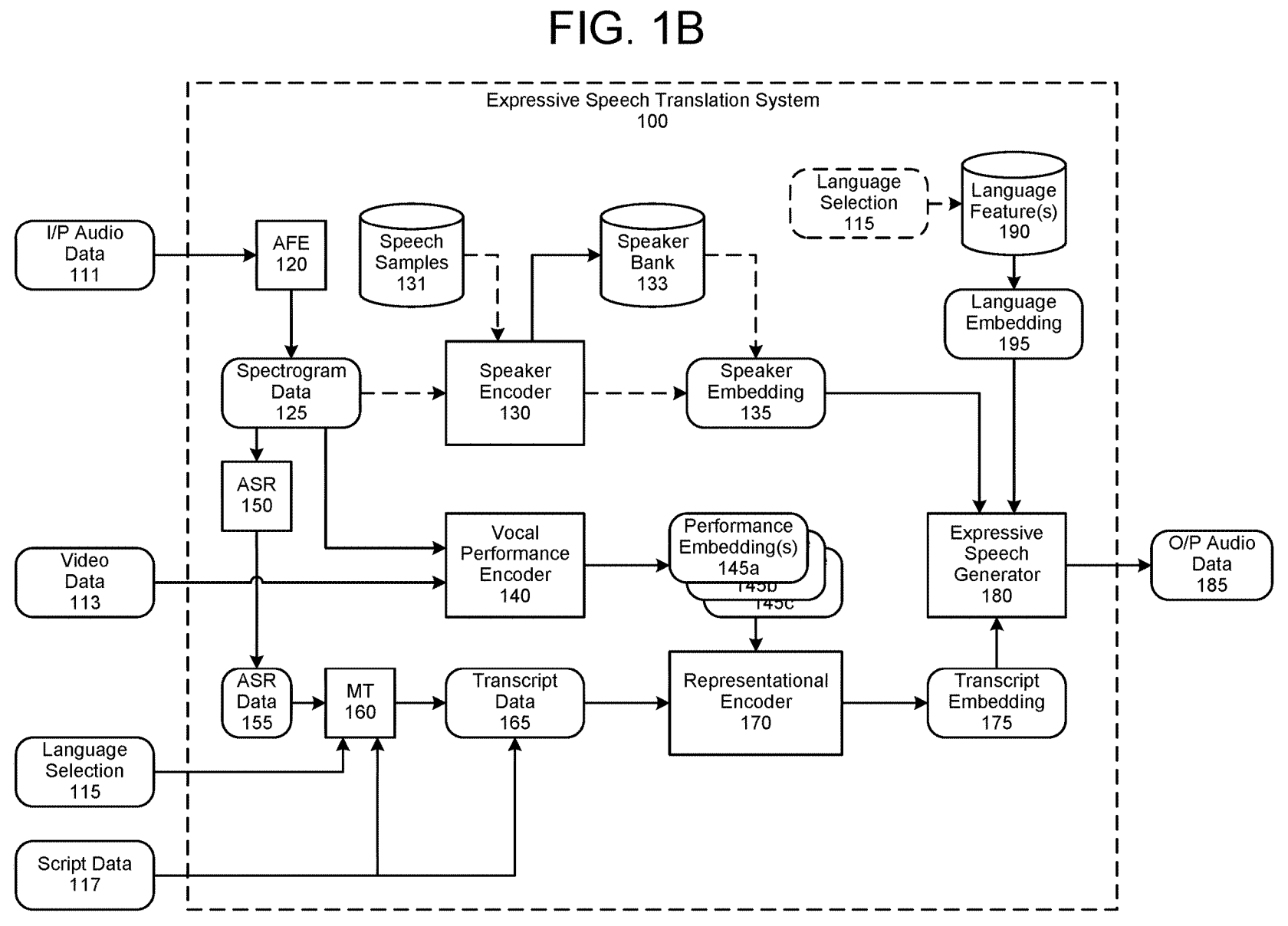

FIG. 1A is a conceptual diagram of an expressive speech translation system 100, and FIG. 1B is a conceptual diagram of the expressive speech translation system 100 in further detail, according to embodiments of the present disclosure. As shown in FIGS. 1A and 1B, the system 100 may be configured to receive input audio data 111 representing source speech and transcript data 165 representing content of speech to be output in a language different from the source speech. The expressive speech translation system 100 may processing the input audio data 111 and the representational data to generate output audio data 185 representing the synthesized speech in the target language.

The expressive speech translation system 100 may generate the synthesized to represent various features and/or characteristics of the source speech such as speaker-specific voice identity characteristics (e.g., a speaker embedding), vocal performance-specific features (e.g., a performance embedding), and language-dependent features (e.g., a language embedding). The expressive speech translation system 100 may use the components illustrated in FIGS. 1A and 1B to "disentangle" voice/speech characteristics that vary depending on expressiveness of the source speech, the identity of the speaker, and the language spoken.

The expressive speech translation system 100 includes a vocal performance encoder 140 for generating performance embedding data 145 using the input audio data 111. The performance embedding data 145 may represent different aspects of the vocal performance corresponding to human-perceived characteristics (e.g., intonation, style, emotion, etc.) and/or system-perceived characteristics (e.g., corresponding to energy envelope, pitch envelope, etc.). The expressive speech translation system 100 may include a language feature storage component 190 that stores language embedding data 195 for various languages/dialects/locales/accents/etc. The language embedding data 195 may represent characteristics of speech that may be common among various speakers of a particular language.

The expressive speech translation system 100 may include a speaker encoder 130 for generating speaker embedding data 135. The speaker embedding data 135 represents voice identity characteristics that differ from speaker to speaker such as fundamental frequency (e.g., pitch), timbre, cadence, etc. In some implementations, the expressive speech translation system 100 may use the speaker encoder 130 to generate speaker embedding data 135b using the input audio data; thus, generating a speaker embedding that represents a speaker of the source speech. In some implementations, the expressive speech translation system 100 may include voice selection 138 that allows a user (e.g., a consumer or creator of media content) to select a voice identity for the synthesized speech. The expressive speech translation system 100 may include a speaker bank 133 that stores speaker embedding data 135a corresponding to different voice identities (e.g., including well known voices such as those of celebrities and/or other voices previously encoded using the speaker encoder 130). In some implementations, the expressive speech translation system 100 may include a speech sample storage component 131 where audio data representing speech samples previously uploaded by a user can be stored for encoding into speaker embedding data 135c. The voice selection 138 can select one or more of the speaker embedding data 135a, 135b, and/or 135c to use for generating synthesized speech.

Figure 2:
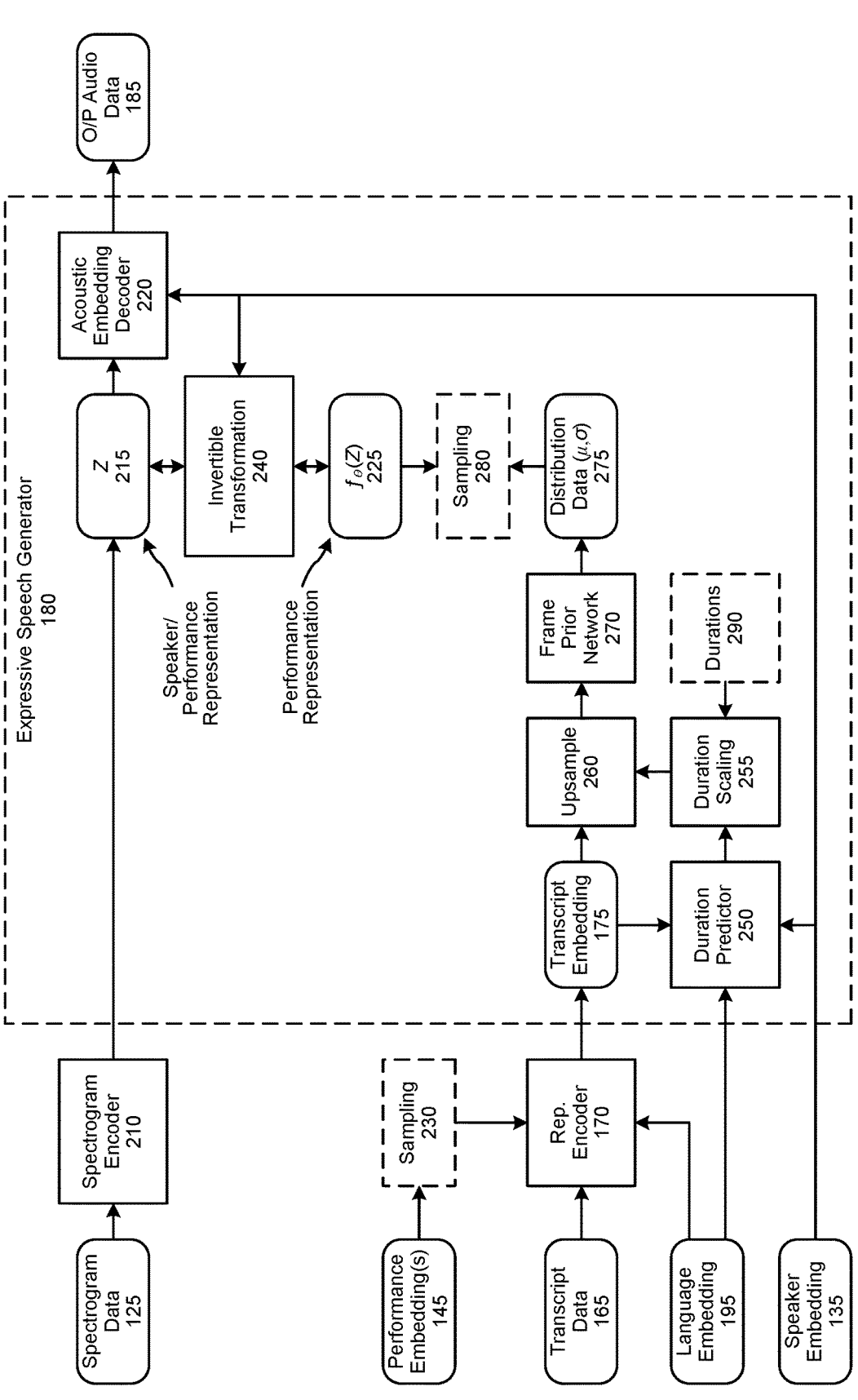
FIG. 2 is a conceptual diagram illustrating operation of an expressive speech generator of the system, according to embodiments of the present disclosure.

The expressive speech translation system 100 includes an expressive speech generator 180 that may synthesize speech that reflects the speech characteristics of the target language and a selected voice identity while reproducing the original speaker's expressiveness as reflected in their vocal performance characteristics. The expressive speech generator 180 may receive the performance embedding data 145, the speaker embedding data 135, the language embedding data 195, and the transcript data 165, and generate output audio data 185. In some implementations, the expressive speech translation system 100 may, as shown in FIG. 1B, include a representational encoder 170 configured to process the transcript data 165 and the performance embedding data 145 to generate transcript embedding data 175 that represents both the content (e.g., text) of the speech to be synthesized as well as the vocal performance characteristics of the source speech. In some implementations, the expressive speech translation system 100 and/or the expressive speech generator 180 may, as shown in FIG. 2, include duration prediction and scaling components that may be used to generate segments of synthesized speech having durations matching the durations of corresponding portions of the source speech. Duration imposition may be used to, for example, automatically dub multimedia content with translated speech that aligns with the source speech and/or mouth movements of the speaker.

FIG. 1B is a conceptual diagram of the expressive speech translation system 100 in further detail, according to embodiments of the present disclosure. In some implementations, the input audio data 111 may be taken from multimedia content such as a movie or TV show that further includes video data 113. In some cases, the multimedia content may include script data 117; for example, representing closed captions, subtitles, and/or a transcript of the multimedia content. The output audio data 185 may include synthesized speech representing the source speech translated from the source language into the target language. A user 5 may select the target language by inputting a language selection 115, which may be used to retrieve a corresponding language embedding data 195 from a language feature storage component 190. In some implementations, the output audio data 185 may be used to dub the multimedia content; for example, by replacing part or all of the original audio track that includes the input audio data 111. In some implementations, the expressive speech translation system 100 may be used as part of a natural-language command processing system 1100 as illustrated in FIGS. 11 through 14.

The system 100 may include various components configured to perform expressive speech translation including an acoustic front end (AFE) 120, a speaker encoder 130, a vocal performance encoder 140, an ASR component 150, a machine translation (MT) component 160, a representational encoder 170, a language feature storage component 190, and an expressive speech generator 180. In some implementations, the speech translation system 100 may more, fewer, and/or different components. The components of the system 100 may be configured and/or trained to disentangle various features and/or characteristics of the source speech such as speaker-specific features (e.g., a speaker embedding), performance-specific features (e.g., a performance embedding), and language-dependent features (e.g., a language embedding).

The AFE 120 may receive an input audio data 111 from various sources including an audio track from media content and/or a microphone of a user device. The input audio data 111 may be an analog signal or a compressed or uncompressed digital signal. The AFE 120 may process the input audio data 111 to generate spectrogram data 125; that is, the AFE 120 may digitize and/or otherwise process the input audio data 111 into frames representing time intervals for which the AFE 120 determines a number of values, called features, representing the qualities of the audio data, along with a set of those values, called a feature vector, representing the features/qualities of the audio data within the frame. In at least some embodiments, audio frames may be 10 ms each. In some embodiments, audio frames may be 30 ms in duration. Many different features may be determined, and each feature may represent some quality of the audio that may be useful for further processing such as encoding a speaker, performance, and/or language embedding and/or performing ASR or other speech processing. A number of approaches may be used by an AFE to process the audio data, such as various spectral-domain features such linear spectrogram, mel-frequency scale spectrogram, mel-frequency cepstral coefficients (MFCCs), perceptual linear predictive (PLP) techniques, neural network feature vector techniques, linear discriminant analysis, semi-tied covariance matrices, or other approaches known to those of skill in the art. In some implementations, if the AFE 120 receives the input audio data 111 from the microphone of a device, the AFE 120 may employ filters and/or signal processing to filter out speech emitted from the loudspeaker of the same and/or nearby connected device (e.g., a wireless speaker in communication with the device).

A speaker encoder 130 may receive the spectrogram data 125 and, if speech is present, determine speaker embedding data 135 of the speech. The speaker embedding data 135 may be, for example, a vector or other data structure that can quantify certain voice identity characteristics that differ from speaker to speaker. Thus, speaker embedding data 135 may be used to identify a particular user's voice using stored data associated with different voices. In other words, the speaker embedding data 135 as determined by the speaker encoder 130 may represent quantified characteristics representing how a particular voice differs from other voices over which the speaker encoder 130 may have been trained. The speaker encoder 130 may be, for example, a neural network. The speaker encoder 130 may be trained using a training corpus comprising samples of speech from different speakers. In some implementations, the training corpus may include annotated data; for example, with labels corresponding to factors relating to voice identity characteristics such as age, gender, dialect, etc. In some implementations, however, the speaker encoder 130 may be partially or completely trained with unlabeled data, and thus permitted to "learn" its own representations of how voice identity characteristics differ among speakers, without the voice identity characteristics learned by the speaker encoder 130 necessarily corresponding to human-defined categories.

In some implementations, the expressive speech translation system 100 may generate synthesized speech having voice identity characteristics of a speaker other than that of the source speech. For example, an actor's voice identity characteristics in the source speech may be replaced with a different actor in the synthesized speech. To synthesize speech having voice identity characteristics different from the source speech, the speaker encoder 130 may process one or more speech samples from a speech sample storage component 131. Additionally or alternatively, a speaker bank 133 (e.g., a speaker embedding storage component) may store speaker embedding data 135 for one or more users. Speaker embedding data 135 generated by the speaker encoder 130 (e.g., based on the spectrogram data 125 and/or one or more speech samples stored in the speech sample storage component 131) may be stored in the speaker bank 133. The stored speaker embedding data 135 may be used for future speech synthesis that may or may not be associated with the input audio data 111 used to generate it; for example, the speaker embedding data 135 may be used to synthesize speech having different voice identity characteristics from the source speech being translated. The speech samples and/or speaker embedding data 135 may correspond to recognizable voices/personalities such as celebrities. A user (e.g., a creator and/or viewer of the media) may select voice identity characteristics for one or more different voices in the source speech and assign speaker embedding data 135 to them. In some implementations, metadata in the original media content may be used to select speaker embedding data 135 for a particular speaker. For example, expressive speech translation system 100 may select speaker embedding data 135 based on the identity of an actor or other personality indicated in the metadata (e.g., film credits). In some implementations, the expressive speech translation system 100 may select speaker embedding data 135 that corresponds to the speaker of the source speech, but without processing the spectrogram data 125 using the speaker encoder 130. For example, a user-recognition component (such as the user-recognition component 1195 shown in FIG. 11) may perform user recognition by comparing audio characteristics in the input audio data 111 to stored voice identity characteristics of various speakers. Selecting the speaker embedding data 135 in this manner rather than encoding may improve system efficiency by reducing the computational resources used to generate the output audio data 185. Thus, in some implementations, the expressive speech translation system 100 may identify a speaker represented in the input audio data 111 and, if speaker embedding data 135 corresponding to that speaker exists, the expressive speech translation system 100 may use that speaker embedding data 135 rather than encoding new speaker embedding data 135 based on the input audio data 111.

A vocal performance encoder 140 may receive the spectrogram data 125 and generate performance embedding data 145 representing vocal performance characteristics of the speech. The vocal performance encoder 140 may include, for example, a trained model such as a neural network encoder. The vocal performance encoder 140 may receive the spectrogram data 125 (e.g., a linear spectrogram representing the input audio data 111) and/or a high-level representation of the input audio data 111 (e.g., as extracted using another encoder). The vocal performance encoder 140 may extract a high-level, reference-style embedding that extracts the vocal performance characteristics represented in the input audio data 111 and encodes them in a performance embedding, which the vocal performance encoder 140 outputs in the performance embedding data 145. The performance embedding data 145 may be, for example, a vector or other data structure that can quantify certain speaker-independent voice performance characteristics of speech related to patterns of time-frequency energy corresponding to human perception of prosodic features such as intonation, speech rate, stress/emphasis, rhythm, style, and/or emotion. These performance characteristics may be reflected in the energy envelope, pitch envelope, phoneme and/or syllable durations, and/or pause durations. In some implementations, performance characteristics may be encoded and reproduced together and without quantifying individual characteristics separately. By encoding the performance characteristics together, the system may generate its own latent representations in a manner that allows it to more accurately reproduce the performance characteristics of speech samples in a training dataset. In some implementations, the vocal performance encoder 140 may generate multiple portions of performance embedding data 145a, 145b, 145c, etc. For example, the vocal performance encoder 140 may generate portions of performance embedding data 145 that correspond to respective sentences, phrases, words, etc. of the input audio data 111. In other cases, the vocal performance encoder 140 may generate portions of performance embedding data 145 that correspond to different aspects of the vocal performance. The different aspects of the vocal performance may correspond to human-perceived characteristics (e.g., intonation, style, emotion, etc.) and/or system-perceived characteristics (e.g., corresponding to energy envelope, pitch envelope, etc.). The performance embedding data 145 may be used to condition other models of the system such as the representational encoder 170 discussed below.

In some implementations, the vocal performance encoder 140 may additionally or alternatively process video data 113 to determine the performance embedding data 145. Facial expressions and/or movement may represent indicators that corelate to performance characteristics of speech. Thus, the vocal performance encoder 140 may take into account the facial expressions and/or movements when determining the performance embedding data 145. The vocal performance encoder 140 may receive the video data 113 in various ways. For example, the raw video data may be fed to the vocal performance encoder 140, and through training (e.g., supervised, semi-supervised, and/or unsupervised learning as described herein) learn to encode features from the video data 113 that are relevant to the vocal performance. In some implementations, the video data 113 may be preprocessed prior to receipt by the vocal performance encoder 140. For example, one or more faces represented in the video data 113 may be encoded as face descriptors. The encoding may produce a three-dimensional mesh representing the face. Coordinates representing the mesh may be fed to the vocal performance encoder 140.

The video data 113 may also be used to determine speech durations (e.g., for a phrase or sentence or other segment of speech between identifiable pauses or breaks). Different aspects of the video data may be relevant for determining vocal performance information versus duration information. For example, when encoding the video data 113 to determine vocal performance embedding data 145, mouth movement may be less relevant to vocal performance because the synthesized speech may represent different mouth movements. Mouth movement may, however, be much more relevant to determining speech segment duration, because time corresponding to a closed mouth may correspond directly to identifiable periods of silence and/or gaps between different speech segments to be aligned.

The system 100 may include various components used to translate the source speech into a target language. Translation may be performed in text or similar representation of natural language (e.g., word and/or subword tokens, etc.). Thus, the system 100 may include an ASR component 150 and/or a machine translation (MT) component 160. The ASR component 150 may transcribe the source speech into ASR data 155. For example, the ASR component 150 may receive the spectrogram data 125 generated by the AFE 120 based on the input audio data 111. The ASR component 150 may process the spectrogram data 125 to generate the ASR data 155. In some implementations, the one or more ASR hypotheses may be further refined using, for example, NLU and/or entity resolution (ER). The NLU and/or ER may be used to interpret the ASR hypotheses based on their semantic meaning and/or known named entities. The ASR data 155 may therefore include a single top-scoring ASR hypothesis or may include an N-best list including multiple top-scoring ASR hypotheses. An N-best list may additionally include a respective score associated with each ASR hypothesis represented therein. The ASR component 150 is described in greater detail below with regard to FIG. 9.

The system 100 may include an MT component 160, which may perform operations related to translating a natural language input in a first language into natural language output in a second language. The MT component 160 may receive input segments (e.g., text data, which may include formatting and/or markup tags such as is used in HTML) and return a translated segment (e.g., translated text data). The MT component 160 is described in additional detail below with reference to FIG. 7.

The MT component 160 may receive ASR data 155 (and, in some implementations, NLU results data which may add semantic meaning to words and/or phrases in the ASR data 155) and translate the ASR data 155 from the source language to a target language. As noted above, the ASR data 155 may be received from ASR component 150 but in certain instances the ASR data 155 may be received from another source, such as in the case of a video that is accompanied by metadata that includes a transcript of the speech (e.g., closed captions and/or subtitles). The MT component 160 may include one or more machine learning models for translating the transcription in a manner that preserves semantic meaning. For example, the MT component 160 may employ a deep neural network (DNN) having an attention mechanism that can take into account the context of a word and/or phrase such that the resulting translation represents the meaning and/or use of the word in context of a semantically cohesive speech segment in which it appears, rather than simply providing the closest literal translation of the word/phrase. Depending on the particular word, phrase, clause, etc., the semantically cohesive segment may include a portion of a sentence, a whole sentence, or more speech than a single sentence. The MT component 160 is described in additional detail below with reference to FIG. 7.

Figure 7:
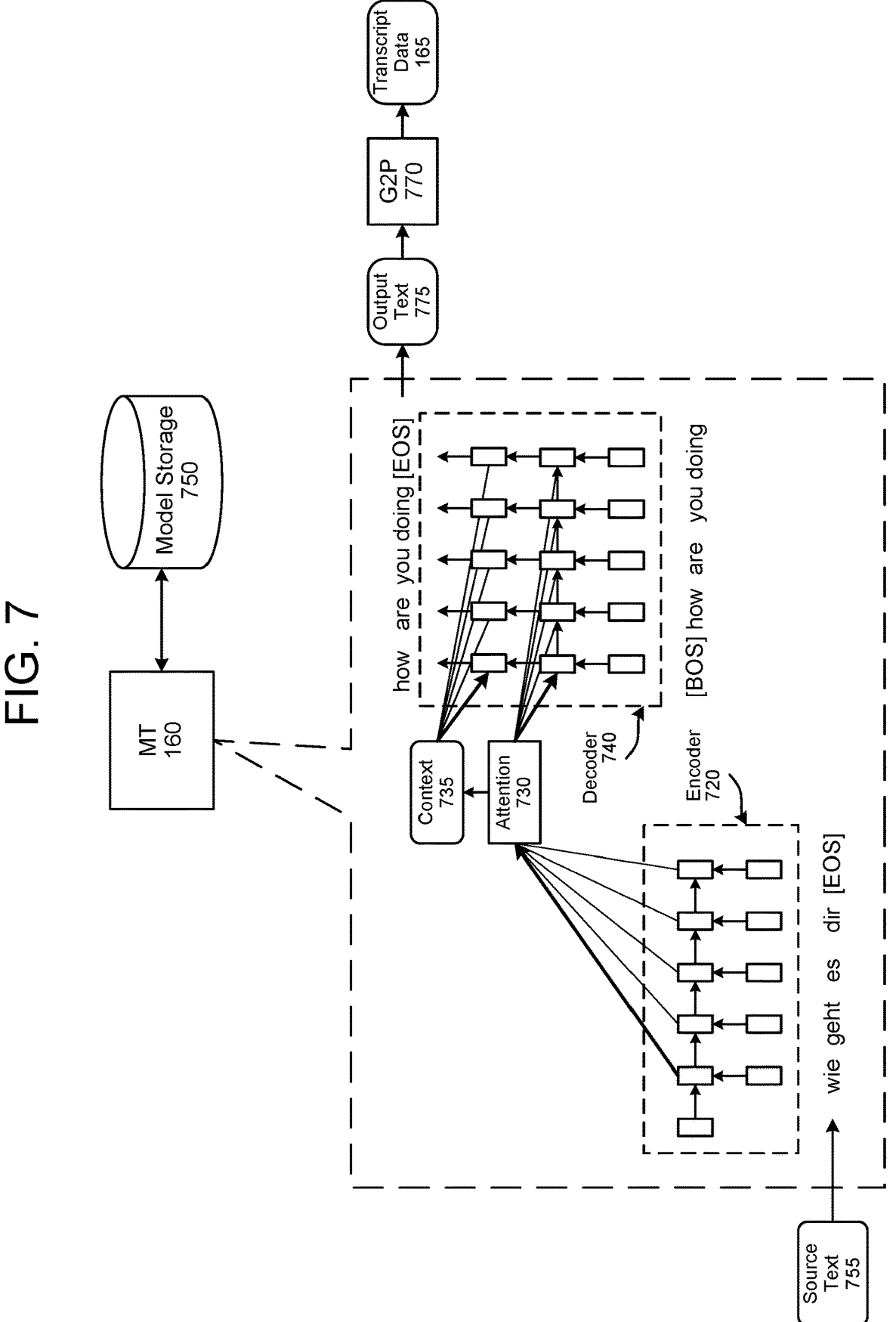
FIG. 7 is a conceptual diagram illustrating a translation component, according to embodiments of the present disclosure.

In some implementations, the system 100 may further include a grapheme-to-phoneme (G2P) component such as the G2P component 770 shown in FIG. 7. The G2P component may be within and/or at the output of the MT component 160. The G2P component may convert the output of the MT component 160 (which may be in the form of, for example, text data, word tokens, subword tokens, etc.) and convert it to transcript data 165. In some implementations, the MT component 160 may output the transcript data 165 directly. In some implementations, other processing may be performed to generate transcript data 165 from the MT component 160 output. The transcript data 165 may represent the target language speech to be synthesized. The G2P component may send the transcript data 165 to a representational encoder 170.

The representational encoder 170 may receive the transcript data 165 representing a transcript of the speech to be output in the target language. The transcript data 165 may include, for example and without limitation, data that represents text, text-derived content tokens, byte-pair encoded characters (BPEs), phonemes, subwords, words, etc. In some cases, the transcript data 165 may include non-speech vocalizations such as sighs, laughter, hissing, etc. The non-speech vocalizations may be transcribed by an automatic speech recognition (ASR) component and/or written into a script/transcript of a performance, presentation, etc.

In some implementations, the transcript data 165 may be generated from text data (e.g., as output by the MT component 160) using, for example, a G2P component such as a the G2P component 770 shown in FIG. 7. The representational encoder 170 may additionally receive the performance embedding data 145 and/or the language embedding data 195 and generate the transcript embedding data 175. The transcript embedding data 175 may be an encoding of the phonetic content of the speech to be generated as enriched with the performance characteristics of the source speech and the speech characteristics of the target language. Thus, the transcript embedding data 175 may represent not only the content of the speech to be generated but also how it should be spoken (e.g., the intonation, speech rate, stress/emphasis, rhythm, style, and/or emotion). The speech characteristics represented in the transcript embedding data 175 may correspond to the vocal performance embedding (e.g., vocal performance characteristics extracted from the source speech) and/or the language embedding (e.g., speech characteristics common to the target language); however, the transcript embedding data 175 may not represent speaker-specific voice identity characteristics of the source speaker. The expressive speech generator 180 may receive the speaker embedding data 135 from the speaker encoder 130 and/or the speaker bank 133 and imbue synthesized speech with speaker-dependent voice identity characteristics as described below with reference to FIG. 2.

The system 100 may include a language feature storage component 190. The language feature storage component 190 may store language embedding data 195 for one or more languages. The language feature storage component 190 may include language embedding data 195 for different languages, dialects, accents, locales, etc. For example, the language feature storage component 190 may store language embedding data 195 for the language Spanish and/or for various dialects/locales such as Castilian, Catalan, Mexican Spanish, etc. The language embedding data 195 may be, for example, a vector or other data structure that quantifies certain characteristics of speech shared by various speakers of a particular language. The language embedding data 195 may be encoded by a trained model such as a neural network encoder that has been trained using speech samples representing different speakers speaking different languages. Such a language encoder may be trained to learn to identify and encode speech characteristics that may be shared by various speakers of a single language.

In this manner the expressive speech translation system 100 may "disentangle" voice/speech characteristics that vary depending on expressiveness of the source speech, the identity of the speaker, and the language spoken. Using the speaker embedding data 135, the performance embedding data 145, and the language embedding data 195, an expressive speech generator 180 may synthesize speech that reflects the speech characteristics of the target language while reproducing the original speaker's expressiveness and preserving their voice identity characteristics.

The expressive speech generator 180 may receive the transcript data 165 and synthesize speech using the speaker embedding data 135, the performance embedding data 145, and the language embedding data 195. In some implementations, the expressive speech generator 180 may receive input in the form of text data, token data (e.g., ASR data 155), and/or other character or symbol input and convert it to transcript data 165 suitable for encoding, as described below. The synthesized speech may be output as output audio data 185. In some implementations, the expressive speech generator 180 may include the speaker encoder 130, the vocal performance encoder 140, and/or the language feature storage component 190. The expressive speech generator 180 is discussed in additional detail below with reference to FIG. 2.

FIG. 2 is a conceptual diagram illustrating operation of the expressive speech generator 180, according to embodiments of the present disclosure. The expressive speech generator 180 may receive the speaker embedding data 135 (e.g., representing speaker-specific voice identity characteristics of the source speech), the transcript embedding data 175 (e.g., representing content of the speech to be output), and the language embedding data 195 (e.g., representing language-dependent speech characteristics corresponding to the target language). The expressive speech generator 180 may process the data to generate the output audio data 185 representing synthesized speech in the target language and having the voice and performance characteristics of the source speech.

The expressive speech generator 180 may include (and/or interface with) a spectrogram encoder 210 and an acoustic embedding decoder 220. During training, the spectrogram encoder 210 may receive spectrogram data 125 representing the source speech and encode it into acoustic embedding data Z 215, mathematically represented by Z. The acoustic embedding decoder 220 may decode the acoustic embedding data Z 215 to generate an output audio data 185. The output audio data 185 may represent, for example, audio data in the form of a waveform (e.g., in contrast to spectrograms). The spectrogram encoder 210 and the acoustic embedding decoder 220 may be trained to encode the spectrogram data 125 into acoustic embedding data Z 215 and decode it into an output audio data 185 that includes a faithful reproduction of speech represented in the spectrogram data 125. Thus, the spectrogram encoder 210 and the acoustic embedding decoder 220 may be configured together as an autoencoder. In some implementations, the spectrogram encoder 210 and the acoustic embedding decoder 220 may be configured as a variational autoencoder (VAE). The spectrogram encoder 210 may be trained to encode the speech represented in the spectrogram data 125 into a latent space from which the acoustic embedding decoder 220 can reproduce speech.

During inference, the acoustic embedding decoder 220 may receive acoustic embedding data Z 215 from an invertible transformation 240 and decode the acoustic embedding data Z 215 to generate the output audio data 185 representing synthesized speech. The invertible transformation may be, for example, a function or functions for which an inverse of the function can be calculated (e.g., bijective functions). For both the transformation and its inverse, each input results in a unique output. An example of an invertible transformation is a normalizing flow. An example of an invertible transformation 240 having a normalizing flow is described in further detail below with reference to FIG. 6. During both training and inference, the acoustic embedding data Z 215 retains (e.g., represents) the voice identity characteristics of the speaker of the source speech; thus, the acoustic embedding data Z 215 can be said to be a speaker/performance representation of speech. The invertible transformation 240 may be configured to remove the voice identity characteristics of a speaker to generate a performance representation mathematically represented by $f_\theta(Z)$ 225 (e.g., an embedding representing the speech with the speaker-specific voice identity characteristics suppressed or removed). During inference, the invertible transformation 240 may be inverted to add the voice identity characteristics back to the performance representation $f_\theta(Z)$ 225 so that the acoustic embedding decoder 220 generates speech having the voice identity characteristics represented in the speaker embedding data 135.

In some implementations, the representational encoder 170 may output the transcript embedding data 175 as a distribution. The representational encoder 170 may perform sampling 280 from the distribution to generate the transcript embedding data 175. The sampling 280 may introduce variation in the reproduction of vocal performance characteristics in the transcript embedding data 175, resulting in natural-sounding variation in the synthesized speech. During training, the representational encoder 170 may be trained based on a comparison of the transcript embedding data 175 (e.g., as scaled and refined by the expressive speech generator 180 to generate the distribution data $(\mu, \sigma)$ 275 as described below) and the performance representation $f_\theta(Z)$ 225 generated by the invertible transformation 240. Training of the components of the expressive speech translation system is described in further detail below with reference to FIG. 4. During inference, the expressive speech generator 180 may use the transcript embedding data 175 (e.g., as scaled and refined by the expressive speech generator 180 to generate the distribution data $(\mu, \sigma)$ 275 as described below) to determine a performance representation $f_\theta(Z)$ 225, which the invertible transformation 240 may use to generate a speaker/performance representation Z 215 as described in further detail below with reference to FIG. 5.

The expressive speech generator 180 may include features for adjusting predicted durations of speech in the target language to match the durations of the corresponding portions of the source speech. The system 100 may determine start points and durations of speech using the input audio data 111 and/or video data. The synthesized speech may then be aligned with the source speech for purposes of, for example, dubbing a video in the target language. The system 100 may include one or more processes to determine durations 290 of phonemes, syllables, words, phrases, segments, etc. of the source speech represented in the input audio data 111. In some implementations, the system 100 may determine durations by detecting periods of silence between segments of speech and/or by identifying a change in speaker based on a change in the voice identity characteristics from one segment of speech to the next. In some implementations, the system 100 may determine durations using image processing to determine when a character's mouth is moving or not (e.g., as performed by an image processing component 1140 as described below with reference to FIGS. 10B and 11). The system 100 may generate duration data 295, which may indicate a start time and duration of a given segment of speech. The duration scaling component 255 may use the duration data 295 to modify the transcript embedding data 175 to reflect the determined durations (e.g., by scaling the transcript embedding data 175 from the predicted durations determined by the duration predictor 250). Performing isochronous translation may be useful for dubbing video where the synthesized speech should align temporally with the source speech and/or movement of the speaker's mouth. Dubbing operations are described further below with reference to FIG. 10A.

The system 100 may use a duration scaling component 255 to adjust the transcript embedding data 175 to approximate or match those durations. The representational encoder 170 may process the transcript data 165 (e.g., corresponding to the target language) and generate transcript embedding data 175. A duration predictor 250 may predict durations at the sentence, word, subword, syllable, and/or phoneme level. The duration predictor 250 may use the transcript embedding data 175 and the language embedding data 195 for the target language to predict durations (e.g., corresponding to the words, phrases, segments, etc. of the input audio data 111). The duration scaling component 255 may compare the predicted durations to the durations indicated in the duration data 295. The duration scaling component 255 may determine a scaling factor that may be used to generate transcript embedding data 175 with durations that correspond to those of the source speech. An upsampler component 260 may use the scaling factor convert the transcript embedding data 175 into a data stream having a frame rate of audio data (e.g., with a vector corresponding to each 10 ms, 20 ms, or 30 ms, etc. of audio data). For example, representational embedding data corresponding to a first phoneme may be duplicated to generate a number of frames corresponding to the predicted duration of that phoneme. In various implementations, the transcript embedding data 175 may correspond to units of speech besides or in addition to phonemes, including syllables, subwords, words, etc.

In some implementations, the duration predictor 250 may determine start points of various phrases, statements, etc., so that the synthesized speech may be aligned with the input speech. The duration predictor 250 may identify strong punctuation boundaries; for example, using punctuation tokens such as commas, semi-colon, periods, etc., that coincides with silence. The duration predictor 250 may concatenate one or more phonemes, syllables, words, etc., of the phrase or statement, and calculate a total duration. The duration predictor 250, duration scaling component 255, and upsampler component 260 may then manipulate transcript embedding data 175 to scale and match a particular phrase or statement to conform to the duration(s) indicated by the duration data 295. The frame prior network 270 may receive and the upsampled data, which encodes audio information for the speech to be synthesized. This representation may represent the performance characteristics of the source speech and/or the speech characteristics of the target language, but not the voice identity characteristics of the speaker of the source speech.

The frame prior network 270 may output the audio information in the form of distribution data ($\mu$, $\sigma$) 275, where u represents a mean of the distribution and $\sigma$ represents the variance. The resulting distribution data ($\mu$, $\sigma$) 275 may represent a latent distribution that may be used for inference and/or training. During training, the system 100 may compare the distribution data ($\mu$, $\sigma$) 275 with the performance representation $f_\theta(Z)$ 225, calculate a loss function, and propagate gradients through the models of the system 100. Training is described in further detail below with reference to FIG. 4. During inference, the system 100 may perform sampling 280 from the distribution data ($\mu$, $\sigma$) 275 to determine the performance representation $f_\theta(Z)$ 225. Sampling 280 may allow for a dynamic speech output having natural-sounding variation (e.g., in the pronunciation of phonemes). Operation of the expressive speech translation system 100 during inference are described in further detail below with reference to FIG. 5.

Figure 3:
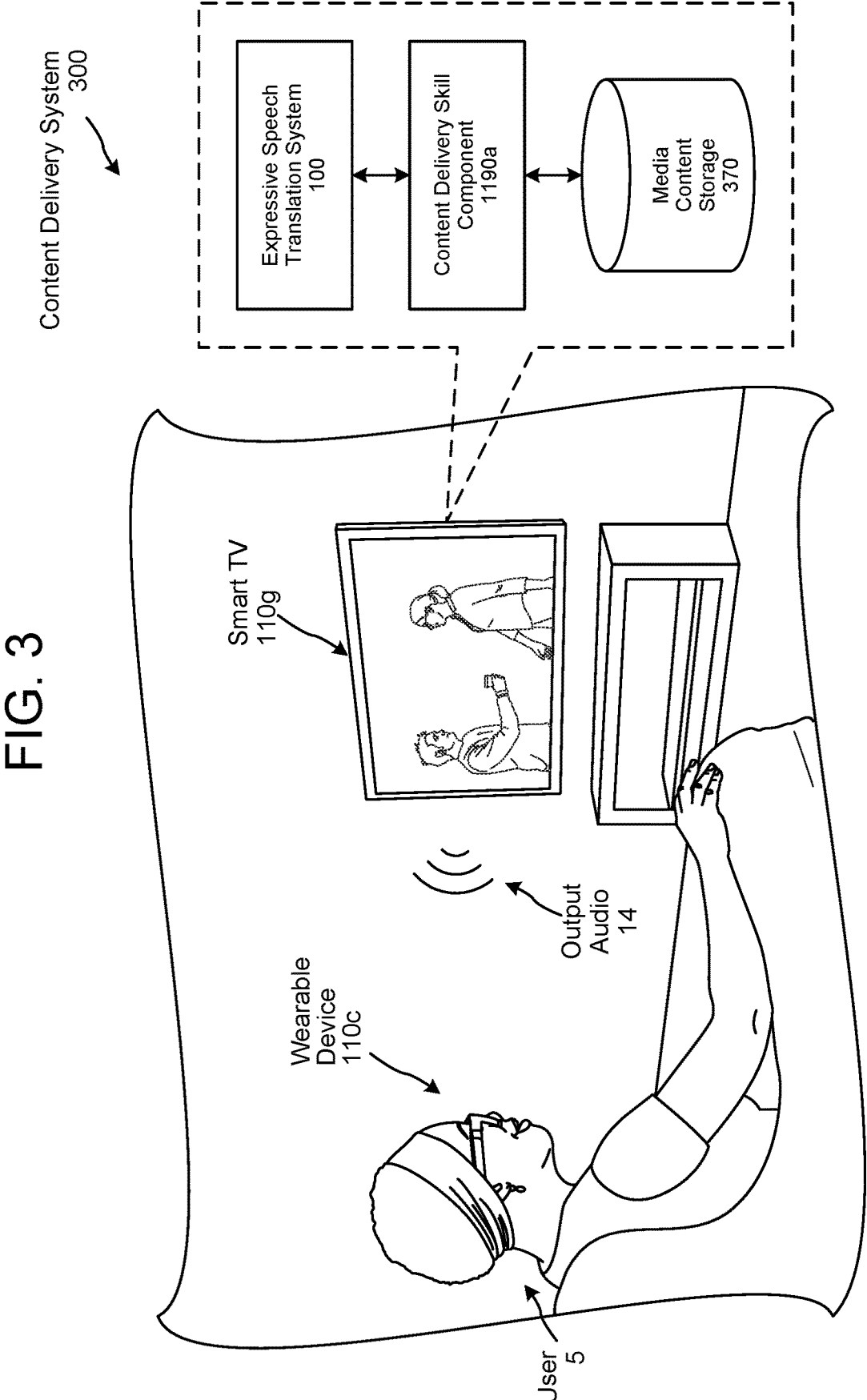
FIG. 3 illustrates an example use of the expressive speech translation system to provide dubbed multimedia content in a content delivery system, according to embodiments of the present disclosure.

FIG. 3 illustrates an example use of the expressive speech translation system 100 to provide dubbed multimedia content in a content delivery system 300, according to embodiments of the present disclosure. The content delivery system 300 may include one or more user devices 110 and/or one or more system components 1120. The user device(s) 110 and/or system component(s) 1120 may employ the expressive speech translation system 100 to dub multimedia content from a multimedia content storage component 370 to replace and/or supplement the original speech in the multimedia content with synthesized speech in a different language. The user device(s) 110 and/or system component(s) 1120 may include a content delivery skill component 1190a configured to provide a user 5 with requested media content.

A skill component 1190 may be hardware and/or software on the user device(s) 110 and/or system component(s) 1120 that is akin to a software application. That is, a skill component 1190 may enable the system component(s) 1120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. Skill components 1190 are described in further detail below with reference to FIG. 11.

A user 5 may watch movies, television, news, sporting events, and/or other multimedia content on, for example, a smart TV 110g. In some implementations, the smart TV 110g may output the dubbed audio (e.g., synthesized speech represented in the output audio data 185) as output audio 14. In some implementations, the user 5 may receive output audio 14 via another user device 110; for example, the wearable device 110c (e.g., smart glasses) shown in FIG. 3 and/or the earbuds 110m/n shown in FIG. 14, etc. Further details regarding the hardware and/or software capabilities and configurations of the user device(s) 110 are described in further detail below with FIG. 11 through 14.

The content delivery system 300 may be equipped with natural language command processing capabilities such as thought described below with reference to FIG. 11. For example, the user 5 may interact with the content delivery system 300 using speech and/or other input modalities to request media content. The content delivery system 30 may process the user's speech, identify an intent and/or entity corresponding to a request to watch a particular item of media content, and engage the content delivery skill component 1190a to deliver the item of media content. The content delivery skill component 1190a may then cause the user device(s) 110 to output the media content.

In some cases, the user 5 may request that the media content be dubbed with synthesized speech in a different language. The content delivery system 300 may process the user's request and engage the expressive speech translation system 100 to translate the original speech; for example, using the operations described with reference to FIGS. 1 and 10, etc. The user 5 may select the desired language/dialect/locale/accent, etc. for the synthesized speech in the output audio data 185 (e.g., by inputting a language selection 115). In some implementations, the user 5 may request a particular voice for the dubbed speech. For example, the user 5 may be able to select dubbed speech with the original speaker's voice identity characteristics (e.g., determined using the speaker encoder 130), select different voice identity characteristics altogether (e.g., from the speaker bank 133), and/or select voice identity characteristics extracted from a speech sample (e.g., from the speech sample storage component 131). Using the language and/or speaker selection, the content delivery system 300 can generate synthesized speech, duration matched to the original so as to align with the video, and provide the user with the multimedia content having the requested dubbed audio.

In some implementations, the dubbed multimedia content may be delivered to a user device 110 lacking a visual display. That is, the translated audio may be provided for audio-only playback without the source video. Nevertheless, the content delivery system 300 may still "align" the synthesized speech with the original speech and video using the duration scaling discussed herein. Even in absence of the corresponding video, synthesized speech aligned in this manner may better represent the original speech; for example, by preserving the timing of the synthesized speech relative to other speech (e.g., which may also be translated/dubbed), sound effects, score, etc. that is also present in the original multimedia content, or simply preserve the dramatic aspect of the original timing.

Figure 4:
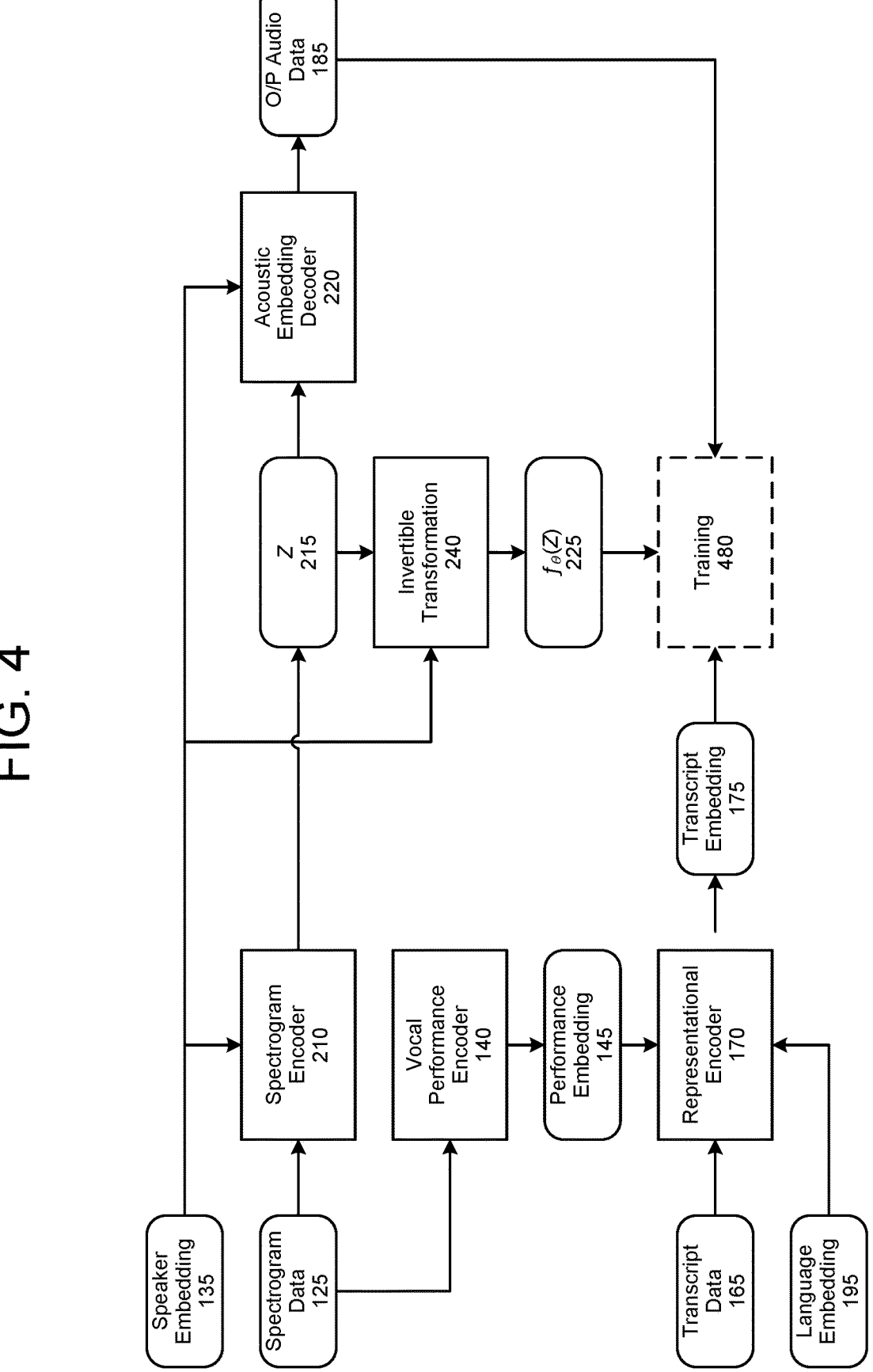
FIG. 4 is a conceptual diagram illustrating example operations for training the expressive speech generator, according to embodiments of the present disclosure.

FIG. 4 is a conceptual diagram illustrating operations for training the system 100, according to embodiments of the present disclosure. During training, the various models of the system may be trained based on a comparison of the transcript embedding data 175 and the performance representation $f_\theta(Z)$ 225 generated by the invertible transformation 240. The spectrogram encoder 210, as condition by the speaker embedding data 135, may process the spectrogram data 125 representing the source speech to generate acoustic embedding data Z 215. The acoustic embedding decoder 220 may process the acoustic embedding data Z 215 to generate the output audio data 185. The output audio data 185 may be compared to the input audio data 111 (e.g., from which the spectrogram data 125 was generated) to calculate the result of a loss function (or multiple loss functions) with gradients propagated back through the spectrogram encoder 210 and the acoustic embedding decoder 220. In some implementations, the spectrogram encoder 210 and the acoustic embedding decoder 220 may make up a variational autoencoder and trained accordingly to, for example, achieve a balance between a reconstruction error and a regularization error (e.g., as expressed as a Kulback-Leibler divergence between a distribution of the acoustic embedding data Z 215 and a Gaussian distribution). In some implementations, the spectrogram encoder 210 and the acoustic embedding decoder 220 may be in a spectrogram-to-audio posterior VAE configuration, as shown in FIG. 2. In some implementations, however, the spectrogram encoder 210 and the acoustic embedding decoder 220 may be in an audio-to-audio posterior VAE configuration. That is, the spectrogram encoder 210 may be replaced with an audio encoder that receives audio data in a waveform format, rather than spectrograms. Otherwise, the training and/or inference operations of the different configurations may be similar. The regularization term is used to regularize the organization of the latent space used by the spectrogram encoder 210 and the acoustic embedding decoder 220 such that the system 100 may be used to generate an output audio data 185 from acoustic embedding data Z 215 generated by the invertible transformation 240 during inference.

To train the invertible transformation 240, however, the acoustic embedding data Z 215 generated by the spectrogram encoder 210 is processed while using the speaker embedding data 135 as a conditioning input. The invertible transformation 240 is thus trained to suppress the speaker-dependent voice identity characteristics to generate a performance representation $f_\theta(Z)$ 225 that approximates a normal distribution (where the acoustic embedding data Z 215 can be said to be a speaker/performance representation that retains the voice identity characteristics of the speaker). During training 480, the performance representation $f_\theta(Z)$ 225 can be compared to the transcript embedding data 175 (e.g., as upsampled and refined via the upsampler component 260 and frame prior network 270 shown in FIG. 2) to calculate gradients for training the representational encoder 170 and/or the invertible transformation 240. In some cases, the vocal performance encoder 140 may also be trained to improve its effectiveness in generating performance embedding data 145 that can add the performance characteristics of the source speech to the transcript data 165 generated based on a translation of the source speech. In some implementations, the expressive speech generator 180 may be trained in a manner similar to generative adversarial networks (GANs). Training in this manner may facilitate unsupervised learning; for example, by gauging how close to human speech the output audio data appears. Thus, the training 480 may also include using a discriminator model to receive an input and predict whether it is "real" (e.g., from a recording of human speech) or "fake" (e.g., synthesized speech). The error for classifications determined by the discriminator model may be used to train other models of the expressive speech generator 180 (e.g., the "generator" in the GAN architecture) to generate more realistic, human-sounding synthesized speech.

During training, the performance embedding data 145 is used to extract performance characteristics from speech samples in a training corpus and add those performance characteristics back into transcript data 165 generated from that same speech (e.g., not translated). The training corpus may include speech samples spanning many languages. During inference, however, the performance embedding data 145 is used to convey performance characteristics from source speech in a source language to synthesized speech in a different, target language.

Figure 5:
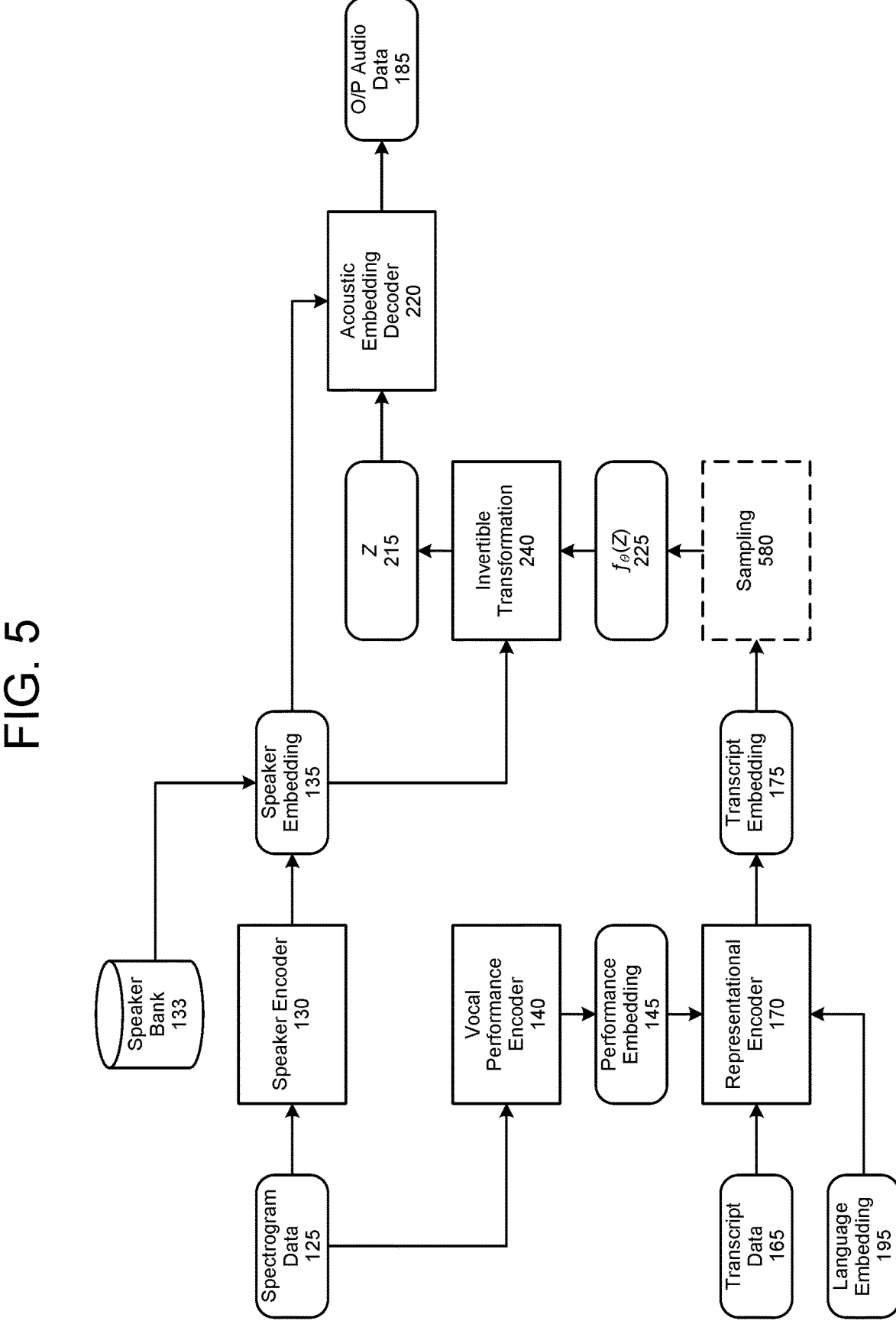
FIG. 5 is a conceptual diagram illustrating an example runtime operation of the expressive speech generator, according to embodiments of the present disclosure.

FIG. 5 is a conceptual diagram illustrating runtime operations of the system 100, according to embodiments of the present disclosure. The system 100 may receive spectrogram data 125 representing source speech in the source language, transcript data 165 corresponding to speech in the target language to be synthesized, and language embedding data 195 corresponding to the target language. The system 100 may process the data to generate an output audio data 185 representing synthesized speech in the target language.

During inference, the representational encoder 170 may generate the transcript embedding data 175 using the transcript data 165, the language embedding data 195, and the performance embedding data 145. Thus, at this point, the transcript embedding data 175 represents phonemes (and/or other units) of the speech to be synthesized as well as the language and performance characteristics of the source speech; however, the transcript embedding data 175 has not yet been imbued with the speaker-dependent voice identity characteristics of the source speech.

The expressive speech generator 180 may sample 580 from the transcript embedding data 175 (that is, from the distribution data ($\mu$, $\sigma$) 275 output by the frame prior network 270) to generate a performance representation $f_\theta(Z)$ 225. The invertible transformation 240 may receive the performance representation $f_\theta(Z)$ 225 sampled from the distribution data ($\mu$, $\sigma$) 275 and, using the speaker embedding data 135 as a conditioning input, generate the speaker/performance representation Z 215. The speaker embedding data 135 may be determined by the speaker encoder 130 and/or retrieved from the speaker bank 133. The acoustic embedding decoder 220 may process the speaker/performance representation Z 215 to generate the output audio data 185, which represents the synthesized speech in the target language and having the performance and speaker characteristics of the source speech.

Figure 6:
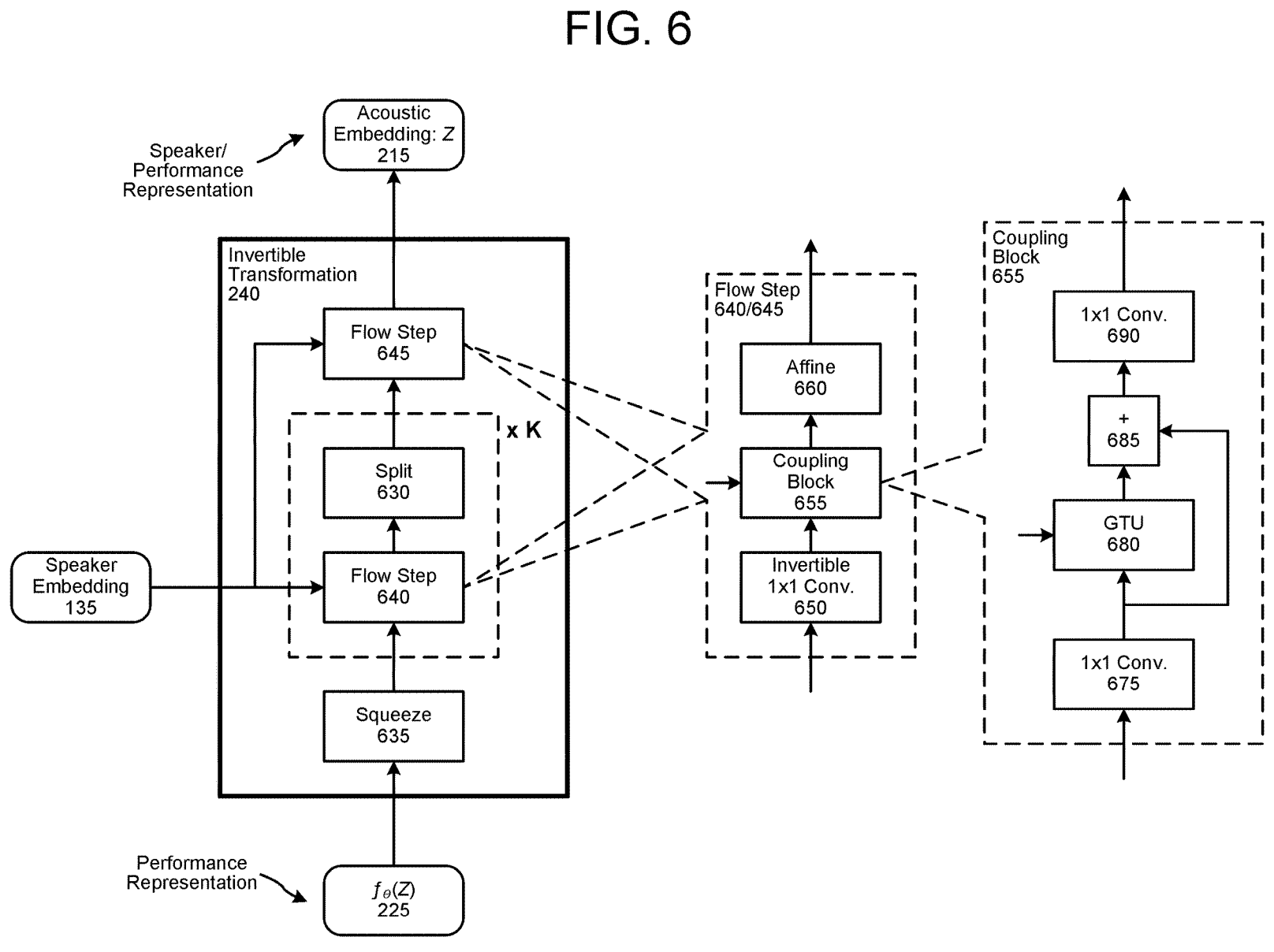

FIG. 6 is a conceptual diagram illustrating details of an invertible transformation 240 configured to add or suppress voice identity characteristics of a speaker, according to embodiments of the present disclosure. The invertible transformation 240 illustrated in FIG. 6 may be a trainable neural network architecture. The invertible transformation 240 may be configured to generate a speaker/performance representation Z 215 from a performance representation $f_\theta(Z)$ 225 using the speaker embedding data 135 as a conditioning input as shown in FIG. 6. Due to its invertible properties, the invertible transformation 240 may be trained by reversing the order of one or more flow steps 640, inputting a speaker/performance representation Z 215, and updating parameters such that the output represents a performance representation $f_\theta(Z)$ 225 having a desired distribution as described below.

The invertible transformation 240 shown in FIG. 6 includes a normalizing flow. Normalizing flows are invertible, generative networks that consist of a series of functions that are invertible such that the analytical inverse of the function can be calculated. Normalizing flows are bijective functions; that is, for each input, a unique output exists, and vice-versa. Thus, they can be used to define an invertible mapping between a data distribution and a prior distribution. Normalizing flows can be implemented with neural networks. To preserve invertibility, nodes of a neural network flow model may employ monotonic activation functions such that each combination of inputs has a unique output, and vice-versa. The invertible transformation 240 may be similar to models used in Flow-TTS and/or Glow-TTS implementations of normalizing flows.

Flow models may be trained using, for example, a negative log-likelihood loss function. The training dataset may include samples of, for example, speaker/performance representations Z 215 and their associated speaker embedding data 135. The speaker/performance representations Z 215 and/or speaker embedding data 135 may be generated from audio data representing speech samples by a spectrogram encoder and speaker encoder, respectively (e.g., the spectrogram encoder 210 and the speaker encoder 130). At each training iteration, the invertible transformation 240 may generate performance representations $f_\theta(Z)$ 225. The performance representations $f_\theta(Z)$ 225 may be compared to a desired data distribution (e.g., to a Gaussian distribution by, for example, calculating the K-L divergence), and gradients may be propagated back through the layers of the invertible transformation 240. When training is complete (e.g., when the loss falls below a threshold and/or when the loss experiences diminishing returns for additional training iterations), the inverse of the various flow steps 640 and 645 may be calculated to generate the invertible transformation 240 used for inference. In some implementations, the various models of the system 100 may be trained in concert; for example, by calculating gradients using one or more loss functions and propagating gradients through the layers of the invertible transformation 240, spectrogram encoder 210, acoustic embedding decoder 220, speaker encoder 130, vocal performance encoder 140, and/or representational encoder 170.

During runtime operation, the invertible transformation 240 may receive a performance representation $f_\theta(Z)$ 225 and speaker embedding data 135 and processing them to determine a speaker/performance representation Z 215. As previously discussed with reference to FIG. 2, the expressive speech generator 180 may determine an input to the invertible transformation 240 using the distribution data $(\mu, \sigma)$ 275 output by the frame prior network 270 and a random value.

In some implementations, the invertible transformation 240 may have a multi-scale architecture. Implementing such multi-scale architecture may make the model more stable during training. To implement a multi-scale architecture, the invertible transformation 240 may include one or more squeeze components 635 and/or split components 630. For example, a squeeze component 635 may take two frames of data having d dimensions and combine them to generate one frame of data having 2d dimensions. The split component 630 may reverse this operation. Flow steps 640 and 645 may process data based on conditioning data such as the speaker embedding data 135. The output of the first flow step 640 may be, for example, a vector. In some implementations, a split component 630 may split the vector to reduce its dimensionality. The first flow step 640 (e.g., and split component 630 and/or squeeze component 635 operations) may be repeated K times, where K may be 1, 4, 16, 32, etc. number of repetitions. The number of repetitions may be a hyperparameter set by designed and/or may be empirically adjusted to balance performance of the invertible transformation 240 against memory and/or compute constraints. In some implementations, a split component 630 may follow every flow step 640. In other implementations, a split component 630 may follow every n flow steps 640, where n may be 1, 4, 8, etc. Following the K repetitions, the invertible transformation 240 includes a second flow step 645. Processing of the second flow step 645 may also be conditioned using the speaker embedding data 135.

The flow steps 640 and/or 645 may be configured as further shown in FIG. 6. A flow step may include an invertible convolution layer 650 (e.g., implementing a 1×1 convolution) that receives the input, which may be the performance representation $f_\theta(Z)$ 225 in the case of the first of the K flow steps 640, or which may be the output of one of the flow steps 640 and/or split components 630. A coupling block 655 may receive the speaker embedding data 135 and process the output of the convolution layer 650. The coupling block and an affine layer 660 may make up an affine block. An affine block may implement a type of normalizing flow in which the input is split into two subsets, which may be mutually exclusive. Data in a first subset of the input is not modified as it passes through the affine block; however, the data in the first subset may be used to transform the data in the second subset as it passes through the affine block. The overall function implemented by the affine block may be an invertible transformation that can be reversed without loss.

In further detail, the coupling block 655 of the flow step may include the components shown in FIG. 6. The coupling block 655 may include another convolution layer 675 (e.g., implementing a 1×1 convolution). The output of the convolution layer 675 may be split, with a first portion going to a gating mechanism such as the gated tanh unit (GTU) block 680 and a second portion bypassing the GTU block 680. The GTU block 680 may process the output of the convolution layer 675 and the speaker embedding data 135 using a combination of hyperbolic tangent (tanh) and sigmoid activation functions. The output of the GTU block 680 may be recombined with the second portion of the convolution layer 675 output at a block 685. The combined data may pass through another convolution layer 690 before outputting the coupling block 655.

FIG. 7 is a conceptual diagram illustrating a translation component (MT) 160, according to embodiments of the present disclosure. The MT component 160 may receive source text data 755 (e.g., similar to the ASR data 155 or other text, text, token, symbol, and/or character data representing a transcript of speech) in a first language and generate output text data 775 (which may also be similar to the ASR data 155 or other text, text, token, symbol, and/or character data representing a transcript of speech) in a second language. The MT component 160 may translate the source text data 755 in a manner that preserves semantic meaning; for example, by translating all or portions of the source text data 755 in semantic translation units, rather than performing a rote word-for-word transcription, which may ignore context and/or different meanings of words when used in different combinations. The MT component 160 may perform the translation using an attention-based mechanism; for example, such as that found in a transformer DNN architecture.

The MT component 160 may include an encoder 720, an attention mechanism 730, and a decoder 740. The MT component 160 may retrieve parameters for the various networks/models from a model storage 750. The encoder 720 may read the source text until an end-of-sentence (EOS) indicator or symbol is received (although the MT component 160 may translate the source text data 755 in a streaming fashion without waiting for an EOS to begin translating). The encoder 720 may produce a hidden representation of the sentence. The hidden representation may be, for example, vectors representing words of the source text in, for example, a sequence-to-sequence model. The encoder 720 may be a recurrent neural network (RNN), such as a long short-term memory (LSTM) network.

The decoder 740 may also be a neural network such as a recurrent neural network (RNN). The decoder 740 may produce the output text data 775 starting with a beginning-of-sentence (BOS) indicator or symbol. The decoder 740 may have access to the source text through the attention mechanism 730. The attention mechanism 730 may generate a context vector 735. The context vector 735 may be filtered for each output time step (e.g., each word). The decoder 740 may use the context vector 735 at each time step to predict the next word. Using the attention mechanism 730, the decoder 740 may decide which word(s) are most relevant for generating a target word. Thus, the attention mechanism 730 may provide the decoder 740 with information about the source text data 755 other than just a single word being translated. The attention mechanism 730 can further indicate a different importance to different words of the source text data 755 (or hidden representation) for purposes of translating a given word. In other words, the attention mechanism 730 may enable the decoder 740 to focus on the most relevant parts of a sentence represented in the source text data 755. This may aid the decoder's 740 capability to correctly translate an ambiguous word or phrase. The decoder 740 may predict subsequent words in the sequence based on the generated word and its hidden representation. The decoder 740 may continue to generate words until it predicts an EOS. The decoder 740 may then generate the output text data 775.

One of both of the encoder 720 or the decoder 740 may include a confidence mechanism. The confidence mechanism may determine a confidence score associated an interpretation of word or phrase (in the case of the encoder 720), or the hidden representation of the word or phrase (in the case of the decoder 740). The confidence score may represent a likelihood that a word/phrase or hidden representation can be unambiguously associated with a particular meaning/translation based on the current information. If the score does not satisfy a certain condition (e.g., is below a threshold), the encoder 720/decoder 740 may continue to process words/hidden representations until the condition is satisfied (e.g., meets or exceeds a threshold). In an example operation, the encoder 720 may receive a word having multiple meanings in the source language (e.g., "run" as used in the earlier example). The encoder 720 may wait to receive additional words until it is has enough information to ascribe "run" to a particular meaning with sufficient confidence. One it has done so, it may output the hidden representation. Likewise, the decoder 740 may receive the hidden representations, which may correspond to one or more possible words in the target language. For example, a hidden representation having a meaning of a manner of locomotion faster than a walk and in which the feet never touch the ground at the same time. Such a meaning may correspond to multiple words in the target language; for example, literal translations of "run," "jog," "sprint," "dash," etc. Thus, the decoder 740 may continue to receive hidden representations of other words until it can select a translation for the chosen hidden representation of "run" with sufficient confidence, taking into account the attention data from the attention mechanism 730.

Figure 11:
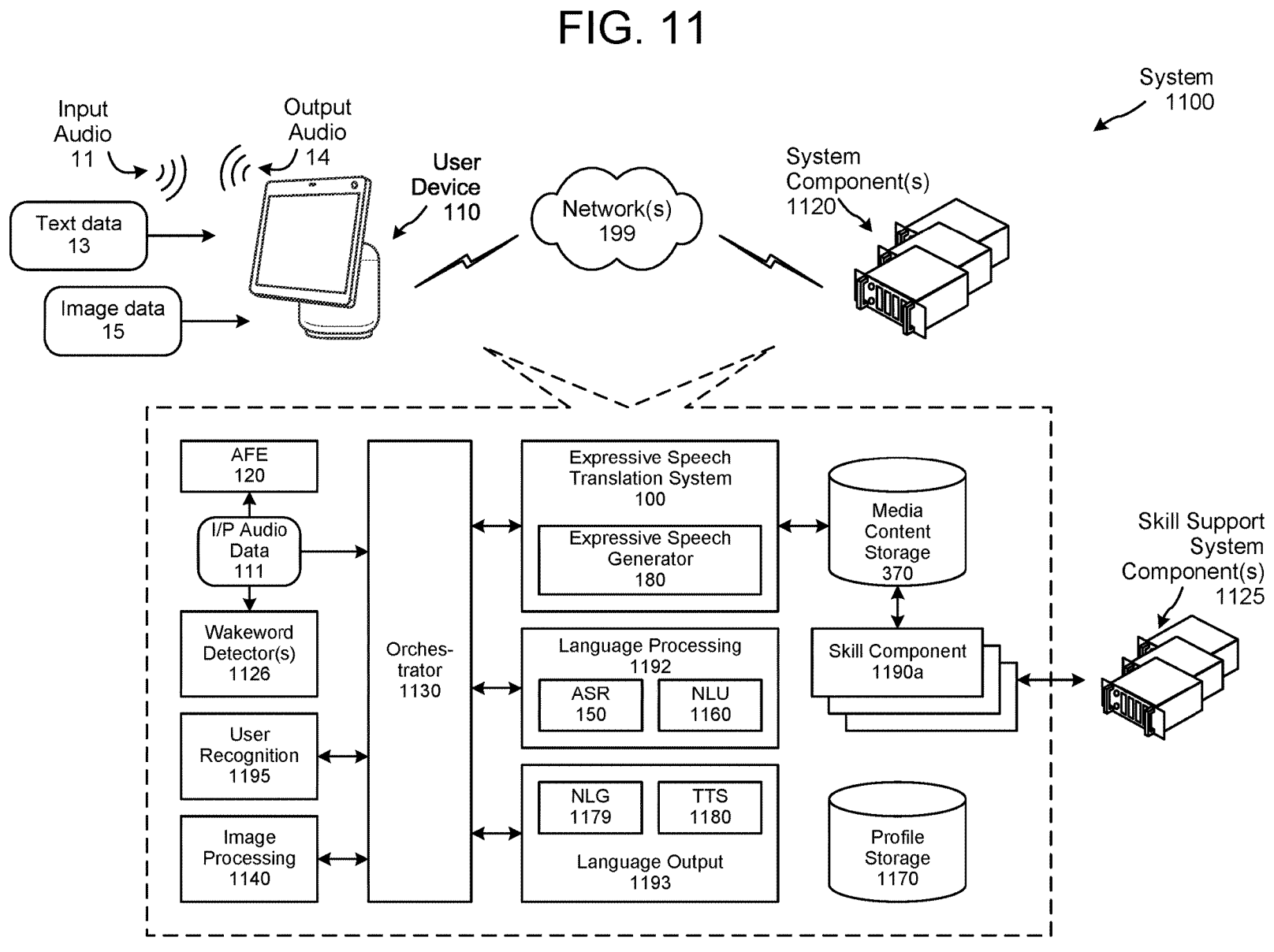

In some implementations, the MT component 160 may leverage natural language processing capabilities of an NLU component such as the NLU component 1160 shown in FIG. 11. For example, the MT component may receive NLU output data that represents a semantic representation of the speech. For example, the NLU results data may represent semantically cohesive speech portions, for example, in the form of <noun><verb><subject> etc. Based on the semantic portioning provided by the NLU processing, the MT component 160 may determine that a portion of the ASR data 155 represents a semantically cohesive segment of speech. The NLU output data may further include intent classification and/or entity resolution data, which may provide information to the MT component regarding a meaning of a particular word or phrase in the context of the recognized speech. The encoder 720 may thus use the NLU output data to select an appropriate hidden representation of a word or phrase from among multiple possibilities.

In some implementations, the MT component may include features that can control the length of the target text; for example, to allow for better alignment with the source text data 755/input audio data 111 and/or to reduce the length of time needed to deliver the translation. That is, providing shorter, terser, and/or condensed translated speech may allow the system 100 to better align the output audio data 185 with the input audio data 111 (e.g., for purposes of dubbing). In some implementations, one or more models used by the MT component may be trained with a verbosity token. For example, training data may be processed to compute a target-source length ratio for entries of the training data. Based on the length ratio, entries may be categorized as short, normal, and long. For example, entries having a length ratio near 1 (e.g., from 0.97 to 1.05) may be categorized as normal. Longer ratios may correspond to long, and shorter ratios may correspond to short. At training time, a verbosity token may be assigned to an embedding vector (e.g., similar to other tokens of the source vocabulary). Thus, the encoder 720 may be fed a sequence of embeddings that includes the verbosity tokens as well as other tokens representing the source sentence. At inference time, a verbosity value may be prepended to the source text data 755. The MT component 160 may thus favor translations that match the verbosity value (e.g., rank them higher than possible translations that may be shorter/longer but have a similar score with regard to semantic meaning). In some implementations, the verbosity value may be provided to the encoder 720, the decoder 740, or both the encoder 720 and decoder 740. In some implementations, the verbosity embedding may be used as an extra bias vector; for example, in a final linear projection layer of the decoder 740.

The G2P component 770 may receive the output text data 775 and convert it to transcript data 165 in the target language. G2P conversion may include generating pronunciation information for words based on their written form. In some implementations, the G2P component 770 may include a simple data structure such as a lookup table that identifies one or more phonemes corresponding to a particular word. In some implementations, the G2P component 770 may receive additional information from the MT component 160 such as a token or other data that includes semantic and/or grammatical information about a word, or otherwise disambiguates the word from potential homographs. In some implementations, the G2P component 770 may include additional intelligence such as a trained model that can output transcript data 165 that accounts for different pronunciations of a word based on context (e.g., adjacent words, punctuation, and/or whether the word is used in a statement, question, exclamation, etc.). The resulting transcript data 165 may be provided to the expressive speech generator 180 for output as synthesized speech.

FIGS. 8A and 8B illustrate an example technique for reducing the effect of noise when capturing performance characteristics of the source speech, according to embodiments of the present disclosure. FIG. 8A illustrates an example of how denoising may be used in training, while FIG. 8B illustrates an example of how a reference noise may be used at runtime to replace a "noisy" noise embedding with a "quieter" noise embedding generated from a high-quality studio recording.

As shown in FIG. 8A, the system 100 may use a denoiser component 810 to improve the quality of the performance embedding data 145 generated from a noisy input audio data 111. In some cases, however, simply processing a denoised waveform 815 output by the denoiser component 810 may not result in useable performance embedding data 145 even if the system 100 is trained in this manner. This is because the denoiser component 810 may not operate perfectly when separating a noise waveform 825 from the denoised waveform 815. Thus, features of noise may remain in the denoised waveform 815, and features of speech may remain in the noise waveform 825. Performance embedding data generated from only the denoised waveform 815 may thus not properly condition the other models of the system 100, resulting distortions in the output audio data 185.

If, however, the system 100 is trained to generate noise embedding data 835 based on the noise waveform 825, at inference, the noise embedding data 835 may be replaced with noise embedding data 855 generated from a high-quality (e.g., low noise) studio recording 850, as shown in FIG. 8B. The noise embedding data 855 may be recombined (e.g., summed) with the denoised performance embedding data 845 to generate the performance embedding data 145.

Accordingly, the system 100 may include a spectrogram extractor 820 configured to generate spectrogram data 125 from the denoised waveform 815 and/or the noise waveform 825. The vocal performance encoder 140 may generate the denoised performance embedding data 845 from the denoised spectrogram data. During training, as shown in FIG. 8A, a noise encoder 830 may generate noise embedding data 835 from the noise spectrogram data. The system 100 may combine the denoised performance embedding data 845 and the noise embedding data 835 to generate the performance embedding data 145. During inference, as shown in FIG. 8B, the system 100 may generate the performance embedding data 145 by combining the denoised performance embedding data 845 with the noise embedding data 855 generated from the high-quality studio recording 850. For example, speech may be recorded in a controlled, low-noise environment. A denoiser component 810 can process the recorded audio data to generate a noise waveform 825. A noise encoder can generate noise embedding data 855 from spectrogram data extracted from the noise waveform 825. The system 100 may store the noise embedding data 855 in a noise feature storage component 860. During inference, the system 100 may use the denoised performance embedding data 845 generated from the input audio data 111 and the noise embedding data 855 retrieved from the noise feature storage component 860 to generate the performance embedding data 145. The resulting performance embedding data 145 will thus represent the voice identity characteristics extracted from the input audio data 111 and noise characteristics extracted from a (presumably) quieter recording.

Figure 9:
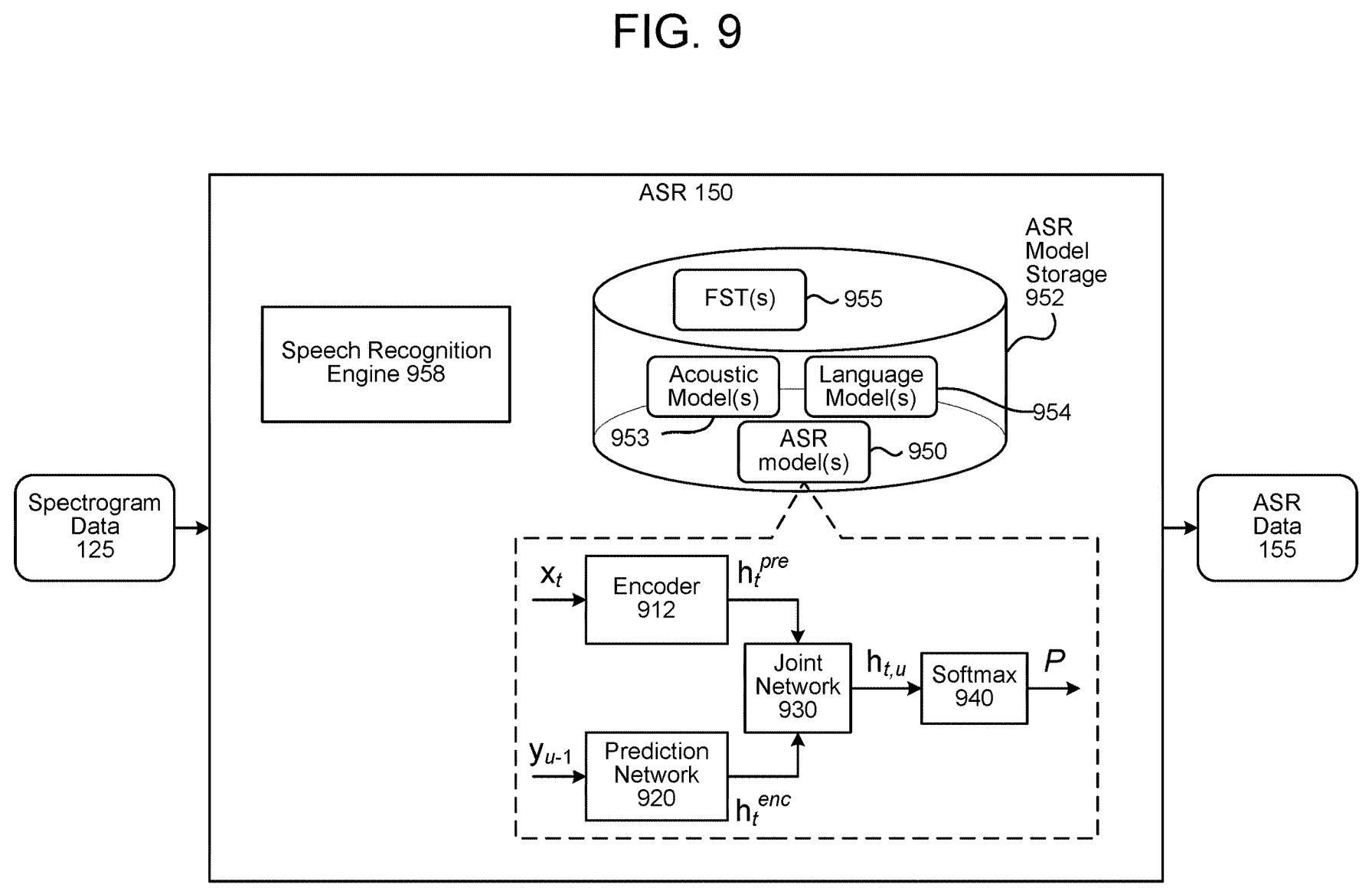

FIG. 9 is a conceptual diagram of an ASR component 150, according to embodiments of the present disclosure. The ASR component 150 may interpret a spoken natural language input based on the similarity between the spoken natural language input and pre-established language models 954 stored in an ASR model storage 952. For example, the ASR component 150 may compare the audio data (e.g., spectrogram data 125) with models for sounds (e.g., sub-word units, syllables, and/or phonemes) and sequences of sounds to identify words that match the sequence of sounds spoken in the natural language input. Alternatively, the ASR component 150 may use a finite state transducer (FST) 955 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 953 stored in the ASR model storage 952), and the likelihood that a particular word, which matches the sounds, would be included in the sentence at the specific location (e.g., using a language model 954). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 958. The ASR component 150 receives spectrogram data 125 (for example, as generated from the input audio data 111 by the AFE 120 or other component). The speech recognition engine 958 compares the spectrogram data 125 with acoustic models 953, language models 954, FST(s) 955, and/or other data models and information for recognizing the speech conveyed in the audio data. The spectrogram data 125 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the user device 110 and/or system component(s) 1120 encoded, in which case they may be decoded by the speech recognition engine 958 and/or prior to processing by the speech recognition engine 958.

In some implementations, the ASR component 150 may process the spectrogram data 125 using the ASR model 950. The ASR model 950 may be, for example, a recurrent neural network such as an RNN-T. An example RNN-T architecture is illustrated in FIG. 9. The ASR model 950 may predict a probability $(y|x)$ of labels $y=(y_1, \ldots, y_u)$ given acoustic features $x=(x_1, \ldots, x_t)$. During inference, the ASR model 950 can generate an N-best list using, for example, a beam search decoding algorithm. The ASR model 950 may include an encoder 912, a prediction network 920, a joint network 930, and a softmax 940. The encoder 912 may be similar or analogous to an acoustic model (e.g., similar to the acoustic model 953 described below), and may process a sequence of acoustic input features to generate encoded hidden representations. The prediction network 920 may be similar or analogous to a language model (e.g., similar to the language model 954 described below), and may process the previous output label predictions, and map them to corresponding hidden representations. The joint network 930 may be, for example, a feed forward neural network (NN) that may process hidden representations from both the encoder 912 and prediction network 920, and predict output label probabilities. The softmax 940 may be a function implemented (e.g., as a layer of the joint network 930) to normalize the predicted output probabilities.

The speech recognition engine 958 may process the spectrogram data 125 with reference to information stored in the ASR model storage 952. Feature vectors of the spectrogram data 125 may arrive at the system component 1120 encoded, in which case they may be decoded prior to processing by the speech recognition engine 958.

The speech recognition engine 958 attempts to match received feature vectors to language acoustic units (e.g., phonemes) and words as known in the stored acoustic models 953, language models 954, and FST(s) 955. For example, spectrogram data 125 may be processed by one or more acoustic model(s) 953 to determine acoustic unit data. The acoustic unit data may include indicators of acoustic units detected in the spectrogram data 125 by the ASR component 150. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 954 (and/or using FST 955) to determine the ASR data 155. The ASR data 155 may include text, subword tokens, word tokens, and/or other character data representing a possible transcript of speech represented in the spectrogram data 125. The ASR data 155 can include one or more hypotheses. One or more of the hypotheses represented in the ASR data 155 may then be sent to further components (such as the NLU component 1160) for further processing as discussed herein. The ASR data 155 may include representations of text of an utterance, such as words, subword units, or the like.

The speech recognition engine 958 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 958 may use the acoustic model(s) 953 to attempt to match received audio feature vectors to words or subword acoustic units. An acoustic unit may be a senone, phoneme, phoneme in context, syllable, part of a syllable, syllable in context, or any other such portion of a word. The speech recognition engine 958 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 958 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 958, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 958 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "HEL O", "HALO", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 10A:
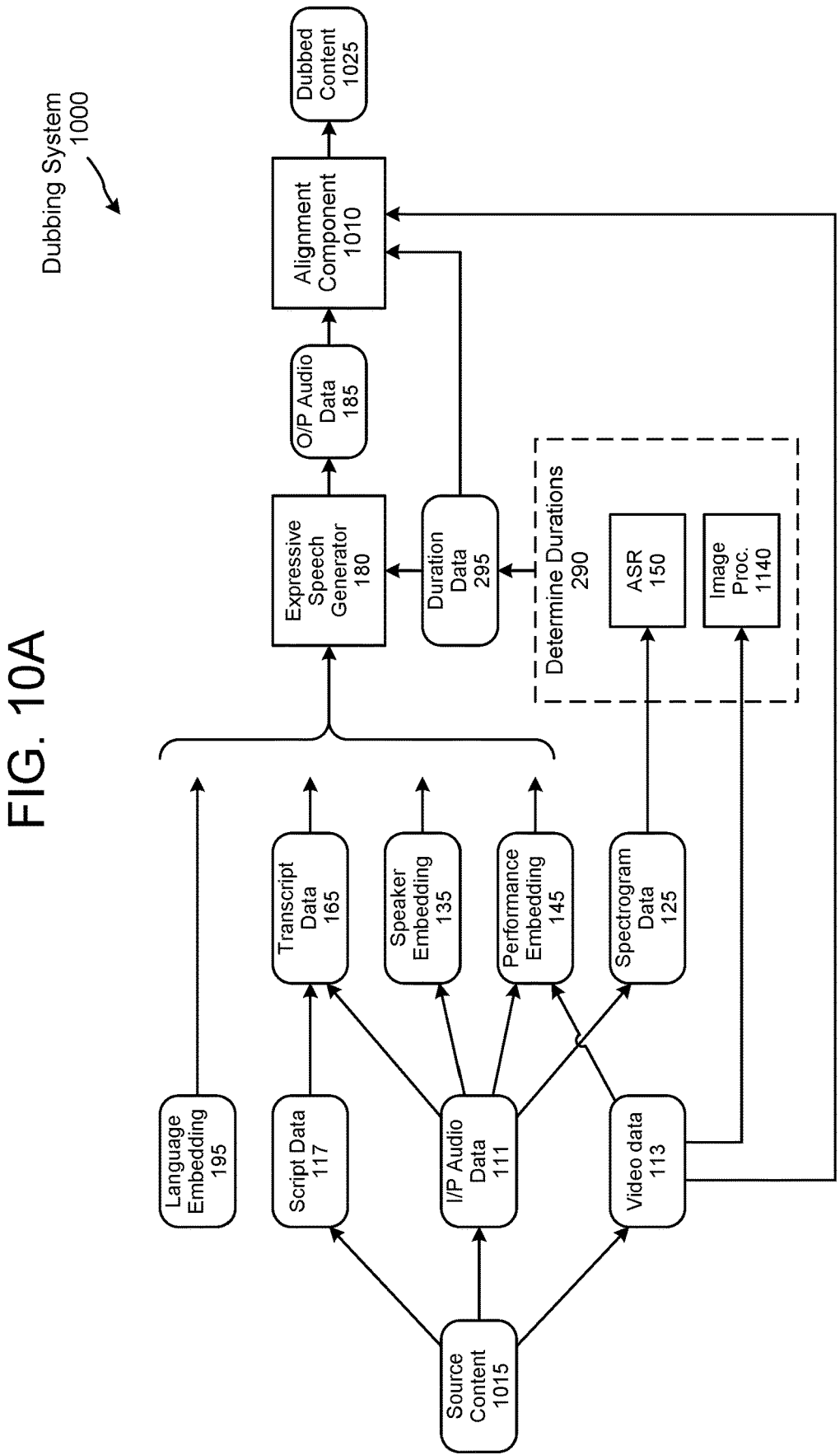
FIG. 10A is a conceptual diagram illustrating operation of an expressive speech translation system used for dubbing, according to embodiments of the present disclosure.

FIG. 10A is a conceptual diagram illustrating operation of an expressive speech translation system 100 used for dubbing (e.g., a dubbing system 1000), according to embodiments of the present disclosure. The dubbing system 1000 may be used to, for example, dub a live-broadcast and/or on-demand multimedia content in real-time or near real-time (e.g., on a brief delay). The dubbing system 1000 may be used to deliver translated multimedia content on a minimal delay of a few seconds to one minute or so. The dubbing system 1000 may receive multimedia data (e.g., source content 1015) that includes both input audio data 111 and video data 113. In some cases, the source content 1015 may include additional data and/or metadata including script data 117 (e.g., a transcript of the input audio data 111, closed caption data, and/or a script including stage directions etc.). In some cases, the source content 1015 may include information related to source and/or target language(s), identifications of speakers (e.g., of the original audio or for selecting speaker embedding data 135 for the synthesized speech), and/or other information.

Using components/techniques of the expressive speech translation system 100 previously described, the dubbing system 1000 may determine transcript data 165 that represents the translated output speech to be synthesized. The dubbing system 1000 may generate the transcript data 165 in a number of ways depending on the source data. In some cases, the dubbing system 1000 may generate the transcript data 165 based on the input audio data 111. The dubbing system 1000 may transcribe speech represented in the input audio data 111 using ASR and translate the resulting ASR data using MT to generate the transcript data 165. In some cases, the dubbing system 1000 may generate the transcript data 165 based on the script data 117. The script data 117 may be in the source language or the target language (e.g., subtitles). If the script data 117 is in the source language (e.g., closed caption data), the dubbing system 1000 may use the MT component 160 to translate the script data 117 into the target language. If the script data 117 is in the target language already (e.g., subtitles), the dubbing system 1000 may convert the script data 117 directly into representational data (e.g., using grapheme-to-phoneme conversion or other technique to generate the desired format such as text-derived tokens, etc.)

The dubbing system 1000 may process the input audio data 111 to determine the vocal performance embedding data 145. In some cases, the dubbing system 1000 may also process the video data 113 to determine the vocal performance embedding data 145. The expressive speech generator 180 may process the various data to generate the output audio data 185 representing synthesized speech in the target language and imbued with the speech and/or voice identity characteristics indicated by the language embedding data 195, the speaker embedding data 135, and/or the performance embedding data 145. An alignment component 1010 may then join the output audio data 185 to the to the video data 113 to generate dubbed content data 1025.

The expressive speech generator 180 may impose durations on the synthesized speech to match those of the source speech. The dubbing system 1000 may determine durations 290 based on audio and/or image processing. For example, the ASR component 150 (and/or a voice activity detector (VAD) may detect pauses in the source speech that can be used to break up speech into segments such as phrases and sentences. The ASR component 150 and/or other component may time the durations of each segment and use the measurements to generate duration data 295. Additionally or alternatively, an image processing component 1140 (described in additional detail below with reference to FIG. 11) may be configured to determine whether or not a character in the video data 113 is speaking. The image processing component 1140 may identify facial movement corresponding to the source speech as shown, for example, in FIG. 10B. The image processing component 1140 may determine a first time at which a character's mouth starts to move and a second time at which a character's mouth ceases to move. The image processing component 1140 may generate the duration data 295 using the first time and the second time. When there are multiple speakers in the source data, the dubbing system 1000 may further take into account speaker and/or facial recognition to determine additional information related to which speaker is speaking at what time. In some implementation, the ASR data 155, VAD output, and/or the image processing data may be combined to more robustly correlate facial movement with speech detected in the input audio data 111, and thus generate more accurate duration data 295.

The expressive speech generator 180 may receive the duration data 295 and use it to scale the transcript data 165 to match the durations of the source speech. For example, when the dubbing system 1000 upsamples the transcript data 165 to the frame rate of the output audio data 185, the dubbing system 1000 my duplicate the transcript data 165 corresponding to a particular unit of speech (e.g., phoneme, syllable, word, etc.) by a number of frames corresponding to the duration determined for that unit of speech.

An alignment component 1010 may receive the output audio data 185 and align it with the video data 113 such that the synthesized speech occurs at the appropriate time; for example, when the corresponding speaker's mouth is moving. The duration data 295 may include start and/or stop times corresponding to a segment of speech that allows the alignment component 1010 to align the output audio data 185 with the video data 113. The dubbing system 1000 may then output dubbed content data 1025 with the synthesized speech and video properly aligned. The dubbed content data 1025 may then be streamed to the user 5 (e.g., via the content delivery skill component 1190*a* as previously described).

FIG. 10B is a conceptual diagram illustrating examples of performing facial measurements and calculating aspect ratios, according to embodiments of the present disclosure. The image processing component 1140 may process the video data 113 to identify landmarks on one or more faces represented in the video data 113. The image processing component 1140 may perform various measurements and/or calculations to determine when a user's mouth is open and closed, which the dubbing system 1000 may use to, for example, determine duration data 295 and/or perform alignment between the output audio data 185 and the video data 113.

In an example operation, the image processing component 1140 may process first image data 1030 (e.g., representing a frame or frame(s) of the video data 113) to estimate first positions for first lip landmarks 1035 associated with a first video frame, and may process second image data 1040 to estimate second positions for second lip landmarks 1045 associated with a second video frame. The first lip landmarks 1035 may correspond to four positions in the user's face, such as a top lip position (e.g., T), a bottom lip position (e.g., B), a left lip position (e.g., L), and a right lip position (e.g., R). The image processing component 1140 may process the first image data 1030 to determine first 3D Morphable Model (3DMM) parameters and may use first expression parameters from the first 3DMM parameters to generate a first mesh model that represents a first agnostic facial representation. Thus, while FIG. 10B illustrates the first lip landmarks 1035 relative to the user's face represented in the first image data 1030, the actual coordinate values used to determine the first positions of the first lip landmarks 1035 are determined based on the first mesh model (e.g., agnostic facial representation 1050). As the first mesh model is generated using only the first expression parameters (e.g., ignoring shape parameter(s), scalar parameter(s), rotation vector(s), translation vector(s), etc.), the first positions of the first lip landmarks 1035 vary based on the facial expression(s) of the user 5 but do not vary based on head movement(s) (e.g., a relative size of the face, rotation of the face, etc.) and/or the like.

To determine the first positions of the first lip landmarks 1035, the image processing component 1140 may generate the first mesh model and determine coordinate values corresponding to the mouth represented in the first mesh model. For example, the image processing component 1140 may determine first coordinate values corresponding to a position along the top lip in the first mesh model (represented in FIG. 10B as T), second coordinate values corresponding to a position along the bottom lip in the first mesh model (represented in FIG. 10B as B), third coordinate values corresponding to an intersection between the top lip and the bottom lip on the left-side of the first mesh model (represented in FIG. 10B as L), and fourth coordinate values corresponding to an intersection between the top lip and the bottom lip on the right-side of the first mesh model (represented in FIG. 10B as R). However, the disclosure is not limited thereto and the exact positions of the first lip landmarks 1035 may vary without departing from the disclosure. For example, in some examples the first coordinate values may correspond to a center of the top lip in the first mesh model, while in other examples the first coordinate values may correspond to a highest position of the top lip in the first mesh model (e.g., highest point along the vertical axis) without departing from the disclosure. Similarly, in some examples the second coordinate values may correspond to a center of the bottom lip in the first mesh model, while in other examples the second coordinate values may correspond to a lowest position of the bottom lip in the first mesh model (e.g., lowest point along the vertical axis) without departing from the disclosure. This applies to the left lip position and the right lip position as well, such that the third coordinate values may correspond to the left-most position of the mouth represented in the first mesh model (e.g., lowest point along the horizontal axis) and the fourth coordinate values may correspond to the right-most position of the mouth represented in the mesh model (e.g., highest point along the horizontal axis) without departing from the disclosure.

Using the first positions of the first lip landmarks 1035, the image processing component 1140 may perform an aspect ratio calculation 1060 to determine a first mouth aspect ratio value corresponding to the first image data 1030. For example, the image processing component 1140 may determine the first mouth aspect ratio value by calculating a ratio between a height of the mouth (e.g., mouth height, or T-B) and a width of the mouth (e.g., mouth width, or R-L) as represented in the first mesh model. In some examples, the image processing component 1140 may determine a first distance value by subtracting the second coordinate values from the first coordinate values, with the first distance value representing a first mouth height associated with the first mesh model. Similarly, the image processing component 1140 may determine a second distance value by subtracting the third coordinate values from the fourth coordinate values, with the second distance value representing a first mouth width associated with the first mesh model. Finally, the image processing component 1140 may determine the first mouth aspect ratio value by dividing the first distance value by the second distance value (e.g., height/width). However, the disclosure is not limited thereto and the image processing component 1140 may determine the first mouth aspect ratio value using any techniques without departing from the disclosure.

As the first mesh model represents a three-dimensional agnostic facial representation, in some examples the coordinate values corresponding to the first lip landmarks 1035 are 3D coordinates (e.g., [x, y, z]). Thus, the first distance value between the first coordinate values (e.g., $[x_1, y_1, z_1]$) and the second coordinate values (e.g., $[x_2, y_2, z_2]$) may be calculated using Equation [1], shown below:

$$d = \sqrt{(x_1 - x_2)^2 + (y_1 - y_2)^2 + (z_1 - z_2)^2} \qquad [1]$$

However, the disclosure is not limited thereto and in other examples the coordinate values corresponding to the first lip landmarks 1035 may be 2D coordinates (e.g., [x, y]), the first distance value may be calculated using only the vertical component of the coordinate values (e.g., first distance=$y_1 - y_2$), and/or the like without departing from the disclosure. Similarly, the second distance value between the third coordinate values (e.g., $[x_3, y_3, z_3]$) and the fourth coordinate values (e.g., $[x_4, y_4, z_4]$) may be calculated using Equation [1], although the disclosure is not limited thereto and the third coordinate values and the fourth coordinate values may be 2D coordinates (e.g., [x, y]), the second distance value may be calculated using only the horizontal component of the coordinate values (e.g., second distance=$x_4$–$x_3$), and/or the like without departing from the disclosure.

As used herein, the mouth height represents vertical dimensions of an opening created by the mouth and may refer to an inner mouth height (e.g., first distance between a bottom of the top lip and a top of the bottom lip), an outer mouth height (e.g., second distance between a top of the top lip and a bottom of the bottom lip), and/or the like without departing from the disclosure. Similarly, the mouth width represents horizontal dimensions of the opening created by the mouth and may refer to an inner mouth width (e.g., third distance between a right side of a first intersection of the top lip and the bottom lip and a left side of a second intersection of the top lip and the bottom lip), an outer mouth width (e.g., fourth distance between a left side of the first intersection and a right side of the second intersection), and/or the like without departing from the disclosure.

The image processing component 1140 may repeat the steps described above to determine a second mouth aspect ratio value corresponding to the second image data 1040. For example, the image processing component 1140 may process the second image data 1040 to determine second 3DMM parameters, may use second expression parameters from the second 3DMM parameters to generate a second mesh model that represents a second agnostic facial representation, may use the second mesh model to determine second positions of the second lip landmarks 1045 (e.g., a second set of coordinate values), and may perform the aspect ratio calculation 1060 to determine a second mouth aspect ratio value corresponding to the second image data 1040.

While FIG. 10B illustrates an example of the image processing component 1140 using four lip landmarks to determine the mouth aspect ratio, the disclosure is not limited thereto. Instead, the image processing component 1140 may use any number of lip landmarks and/or other facial landmarks to determine the mouth aspect ratio without departing from the disclosure. Additionally or alternatively, while FIG. 10B illustrates an example of the image processing component 1140 using the mouth aspect ratio as a proxy for to determine whether the user 5 is speaking, the disclosure is not limited thereto and the image processing component 1140 may use other facial measurements to determine whether the user 5 is speaking without departing from the disclosure. For example, the image processing component 1140 may determine one or more facial measurements using lip landmark(s) and/or facial landmark(s), determine whether the user 5 is speaking based on two or more facial measurements, and/or the like without departing from the disclosure.

FIG. 10B further illustrates additional examples of facial measurements. For example, the image processing component 1140 may determine the mouth aspect ratio using the aspect ratio calculation 1060, which divides the mouth height by the mouth width to determine a single number that represents how much the mouth is opening. Thus, the mouth aspect ratio corresponds to a lower number when the mouth is closed (e.g., not talking) and a higher number when the mouth is open (e.g., talking). Alternatively, the image processing component 1140 may determine a mouth area using mouth area calculation 1070, which multiplies the mouth height by the mouth width to determine a single number that represents how much the mouth is opening. Thus, the mouth area corresponds to a lower number when the mouth is closed (e.g., not talking) and a higher number when the mouth is open (e.g., talking). Additionally or alternatively, in some examples the image processing component 1140 may determine whether the user 5 is speaking using only the bottom lip coordinates (e.g., B), as illustrated by bottom lip measurement 1080, without departing from the disclosure. However, the disclosure is not limited thereto and the image processing component 1140 may perform facial measurement using more, fewer, or different landmarks and/or by using different calculations and/or measurements without departing from the disclosure.

While FIG. 10B illustrates an example of the image processing component 1140 determining a single variable (e.g., mouth aspect ratio), the disclosure is not limited thereto. In some examples the image processing component 1140 may generate multiple variables without departing from the disclosure. For example, the image processing component 1140 may determine a first mouth aspect ratio (e.g., using an inner mouth height and inner mouth width) and a second mouth aspect ratio (e.g., using an outer mouth height and an outer mouth width), although the disclosure is not limited thereto. The image processing component 1140 may process the multiple variables to generate a single standard deviation (e.g., determining difference values between the second mouth aspect ratio and the first mouth aspect ratio and then calculating the standard deviation of the difference values) or to generate multiple standard deviations (e.g., determining a first standard deviation for the first mouth aspect ratio and a second standard deviation for the second mouth aspect ratio), although the disclosure is not limited thereto. In some examples, the image processing component 1140 may include a neural network classifier configured to process multiple facial measurements (e.g., first mouth aspect ratio, second mouth aspect ratio, mouth width, mouth height, and/or the like) from the raw video data 113, a 3D mesh, and/or an agnostic facial representation 1050 and output a mouth-open indication and a mouth-closed indication, in some cases including timing information corresponding to each, although the disclosure is not limited thereto.

FIG. 11 is a conceptual diagram of a system 1100 including components for processing natural language commands, according to embodiments of the present disclosure. The natural language command processing system 1100 may operate using various components as described in FIG. 11 as well as those of the expressive speech translation system 100 including the expressive speech generator 180 previously described. The various components may be located on same or different physical devices. Communication between various components may occur directly or across a network(s) 199. The device 110 may include audio capture component (s), such as a microphone or array of microphones of a device 110, captures audio 11 and creates corresponding audio data. Once speech is detected in audio data representing the audio 11, the device 110 may determine if the speech is directed at the device 110/system component 1120. In at least some embodiments, such determination may be made using a wakeword detection component 1126. The wakeword detection component 1126 may be configured to detect various wakewords. In at least some examples, each wakeword may correspond to a name of a different digital assistant. An example wakeword/digital assistant name is "Alexa." In another example, input to the system may be in form of text data 13, for example as a result of a user typing an input into a user interface of device 110. Other input forms may include indication that the user has pressed a physical or virtual button on device 110, the user has made a gesture, etc. The device 110 may also capture images using camera(s) 1218 of the device 110 and may send image data 15 representing those image(s) to the system component 1120. The image data 15 may include raw image data or image data processed by the device 110 before sending to the system component 1120. The image data 15 may be used in various manners by different components of the system to perform operations such as determining whether a user is directing an utterance to the system, interpreting a user command, responding to a user command, etc.

The wakeword detection component 1126 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1126 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1126 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1126 and/or input is detected by an input detector, the device 110 may "wake" and begin transmitting input audio data 111, representing the audio 11, to the system component(s) 1120. The input audio data 111 may include data corresponding to the wakeword; in other embodiments, the portion of the audio corresponding to the wakeword is removed by the device 110 prior to sending the input audio data 111 to the system component(s) 1120. In the case of touch input detection or gesture-based input detection, the audio data may not include a wakeword.

In some implementations, the system 100 may include more than one system component 1120. The system components 1120 may respond to different wakewords and/or perform different categories of tasks. Each system component 1120 may be associated with its own wakeword such that speaking a certain wakeword results in audio data be sent to and processed by a particular system. For example, detection of the wakeword "Alexa" by the wakeword detection component 1126 may result in sending audio data to a first system component for processing while detection of the wakeword "Computer" by the wakeword detector may result in sending audio data to a second system component for processing. The system may have a separate wakeword and system for different skills/systems (e.g., "Dungeon Master" for a third game play skill/system component) and/or such skills/systems may be coordinated by one or more skill component(s) 1190a, 1190b, 1190c, etc. (collectively "skill components 1190"), of one or more system components 1120. For example, the system 1100 may include a content delivery skill component 1190a such as described with reference to FIG. 3. The content delivery skill component 1190a may retrieve multimedia content from the multimedia content storage component 370 and provide it for output from the user device 110. If the user 5 requests translation of the media content, the system can use the expressive speech translation system 100 to translate and/or dub the media content.

Upon receipt by the system component(s) 1120, the input audio data 111 may be sent to an orchestrator component 1130. The orchestrator component 1130 may include memory and logic that enables the orchestrator component 1130 to transmit various pieces and forms of data to various components of the system, as well as perform other operations as described herein.

The orchestrator component 1130 may send the input audio data 111 to language processing components 1192. The language processing components 1192 (sometimes also referred to as spoken language understanding (SLU) components) includes an automatic speech recognition (ASR) component 150 and a natural language understanding (NLU) component 1160. The ASR component 150 may transcribe the input audio data 111 into text data. The text data output by the ASR component 150 represents one or more than one (e.g., in the form of an N-best list) ASR hypotheses representing speech represented in the input audio data 111. The ASR component 150 interprets the speech in the input audio data 111 based on a similarity between the input audio data 111 and pre-established language models. For example, the ASR component 150 may compare the input audio data 111 with models for sounds (e.g., acoustic units such as phonemes, senons, phones, etc.) and sequences of sounds to identify words that match the sequence of sounds of the speech represented in the input audio data 111. The ASR component 150 sends the text data generated thereby to an NLU component 1160, via, in some embodiments, the orchestrator component 1130. The text data sent from the ASR component 150 to the NLU component 1160 may include a single top-scoring ASR hypothesis or may include an N-best list including multiple top-scoring ASR hypotheses. An N-best list may additionally include a respective score associated with each ASR hypothesis represented therein. The ASR component 150 was previously described with regard to FIG. 9.

The language processing components 1192 may further include a NLU component 1160. The NLU component 1160 may receive the text data from the ASR component. The NLU component 1160 may attempts to make a semantic interpretation of the phrase(s) or statement(s) represented in the text data input therein by determining one or more meanings associated with the phrase(s) or statement(s) represented in the text data. The NLU component 1160 may determine an intent representing an action that a user desires be performed and may determine information that allows a device (e.g., the device 110, the system component(s) 1120, a skill component 1190, a skill system component(s) 1125, etc.) to execute the intent. For example, if the text data corresponds to "play the 5th Symphony by Beethoven," the NLU component 1160 may determine an intent that the system output music and may identify "Beethoven" as an artist/composer and "5th Symphony" as the piece of music to be played. For further example, if the text data corresponds to "what is the weather," the NLU component 1160 may determine an intent that the system output weather information associated with a geographic location of the device 110. In another example, if the text data corresponds to "turn off the lights," the NLU component 1160 may determine an intent that the system turn off lights associated with the device 110 or the user 5. However, if the NLU component 1160 is unable to resolve the entity—for example, because the entity is referred to by anaphora such as "this song" or "my next appointment"—the language processing components 1192 can send a decode request to other language processing components 1192 for information regarding the entity mention and/or other context related to the utterance. The other language processing components 1192 may augment, correct, or base results data upon the input audio data 111 as well as any data received from the other language processing components 1192.

The NLU component 1160 may return NLU results data (which may include tagged text data, indicators of intent, etc.) back to the orchestrator component 1130. The orchestrator component 1130 may forward the NLU results data to a skill component(s) 1190. If the NLU results data includes a single NLU hypothesis, the NLU component 1160 and the orchestrator component 1130 may direct the NLU results data to the skill component(s) 1190 associated with the NLU hypothesis. If the NLU results data includes an N-best list of NLU hypotheses, the NLU component 1160 and the orchestrator component 1130 may direct the top scoring NLU hypothesis to a skill component(s) 1190 associated with the top scoring NLU hypothesis. The system may also include a post-NLU ranker which may incorporate other information to rank potential interpretations determined by the NLU component 1160.

A skill component may be software running on the system component(s) 1120 that is akin to a software application. That is, a skill component 1190 may enable the system component(s) 1120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 1120 may be configured with more than one skill component 1190. For example, a weather service skill component may enable the system component(s) 1120 to provide weather information, a car service skill component may enable the system component(s) 1120 to book a trip with respect to a taxi or ride sharing service, a restaurant skill component may enable the system component(s) 1120 to order a pizza with respect to the restaurant's online ordering system, etc. A skill component 1190 may operate in conjunction between the system component(s) 1120 and other devices, such as the device 110, in order to complete certain functions. Inputs to a skill component 1190 may come from speech processing interactions or through other interactions or input sources. A skill component 1190 may include hardware, software, firmware, or the like that may be dedicated to a particular skill component 1190 or shared among different skill components 1190.

A skill support system component(s) 1125 may communicate with a skill component(s) 1190 within the system component(s) 1120 and/or directly with the orchestrator component 1130 or with other components. A skill support system component(s) 1125 may be configured to perform one or more actions. An ability to perform such action(s) may sometimes be referred to as a "skill." That is, a skill may enable a skill support system component(s) 1125 to execute specific functionality in order to provide data or perform some other action requested by a user. For example, a weather service skill may enable a skill support system component(s) 1125 to provide weather information to the system component(s) 1120, a car service skill may enable a skill support system component(s) 1125 to book a trip with respect to a taxi or ride sharing service, an order pizza skill may enable a skill support system component(s) 1125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 1120 may be configured with a skill component 1190 dedicated to interacting with the skill support system component(s) 1125. Unless expressly stated otherwise, reference to a skill, skill device, or skill component may include a skill component 1190 operated by the system component(s) 1120 and/or skill operated by the skill support system component(s) 1125. Moreover, the functionality described herein as a skill or skill may be referred to using many different terms, such as an action, bot, app, or the like. The skill component 1190 and or skill support system component(s) 1125 may return output data to the orchestrator component 1130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component 1120 may include language output components 1193. The language output component 1193 includes a natural language generation (NLG) component 1179 and a text-to-speech (TTS) component 1180. The NLG component 1179 can generate text for purposes of TTS output to a user. For example the NLG component 1179 may generate text corresponding to instructions corresponding to a particular action for the user to perform. The NLG component 1179 may generate appropriate text for various outputs as described herein. The NLG component 1179 may include one or more trained models configured to output text appropriate for a particular input. The text output by the NLG component 1179 may become input for the TTS component 1180 (e.g., output text data discussed below). Alternatively or in addition, the TTS component 1180 may receive text data from a skill component 1190 or other system component for output. In some implementations, the TTS component 1180 and the expressive speech generator 180 may be combined.

The NLG component 1179 may include a trained model. The NLG component 1179 may generate text data from dialog data received (e.g., from a dialog manager) such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1180.

The TTS component 1180 may generate audio data (e.g., synthesized speech) from text data using one or more different methods. Text data input to the TTS component 1180 may come from a skill component 1190, the orchestrator component 1130, or another component of the system. In one method of synthesis called unit selection, the TTS component 1180 matches text data against a database of recorded speech. The TTS component 1180 selects matching units of recorded speech and concatenates the units together to form audio data. In another method of synthesis called parametric synthesis, the TTS component 1180 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 1120 as image data. The device 110 may further include circuitry for voice command-based control of the camera, allowing a user 5 to request capture of image or video data. The device 110 may process the commands locally or send input audio data 111 representing the commands to the system component(s) 1120 for processing, after which the system component(s) 1120 may return output data that can cause the device 110 to engage its camera.

Upon receipt by the system component(s) 1120, the image data 15 may be sent to an orchestrator component 1130. The orchestrator component 1130 may send the image data 15 to an image processing component 1140. The image processing component 1140 can perform computer vision functions such as object recognition, modeling, reconstruction, etc. For example, the image processing component 1140 may detect a person, face, etc. (which may then be identified using user-recognition component 1195). The image processing component 1140 may detect movement of a face (e.g., in the mouth, jaw, etc.) that corresponds with speaking. The image processing component 1140 may output image processing data that indicates start/stop times of facial movement indicative of speech. In some implementations, the image processing data may indicate the person/character/speaker to whom the facial movement corresponds. The expressive speech translation system 100 may use the image processing data to determine durations of source speech for use in dubbing multimedia content with translated speech that corresponds temporally with the source speech and facial movement of the speaker.

In some implementations, the image processing component 1140 can detect the presence of text in an image. In such implementations, the image processing component 1140 can recognize the presence of text, convert the image data to text data, and send the resulting text data via the orchestrator component 1130 to the language processing components 1192 for processing by the NLU component 1160.

The system component(s) 1120 may include a user-recognition component 1195 that recognizes one or more users using a variety of data, including data generated by the image processing component 1140. The user-recognition component 1195 may take as input the input audio data 111 and/or ASR data 155 output by the ASR component 150. The user-recognition component 1195 may perform user recognition by comparing audio characteristics in the input audio data 111 to stored audio characteristics of users. The user-recognition component 1195 may also perform user recognition by comparing biometric data (e.g., fingerprint data, iris data, etc.), received by the system in correlation with the present user input, to stored biometric data of users assuming user permission and previous authorization. The user-recognition component 1195 may further perform user recognition by comparing image data (e.g., including a representation of at least a feature of a user), received by the system in correlation with the present user input, with stored image data including representations of features of different users. The user-recognition component 1195 may perform additional user recognition processes, including those known in the art.

The user-recognition component 1195 determines scores indicating whether user input originated from a particular user. For example, a first score may indicate a likelihood that the user input originated from a first user, a second score may indicate a likelihood that the user input originated from a second user, etc. The user-recognition component 1195 also determines an overall confidence regarding the accuracy of user recognition operations.

Output of the user-recognition component 1195 may include a single user identifier corresponding to the most likely user that originated the user input. Alternatively, output of the user-recognition component 1195 may include an N-best list of user identifiers with respective scores indicating likelihoods of respective users originating the user input. The output of the user-recognition component 1195 may be used to inform NLU processing as well as processing performed by other components of the system.

The system 100 (either on device 110, system component 1120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component 1120 with permission to allow the skill to execute with respect to the user's natural language user inputs. If a user does not enable a skill, the system component 1120 may not invoke the skill to execute with respect to the user's natural language user inputs.

The profile storage 1170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
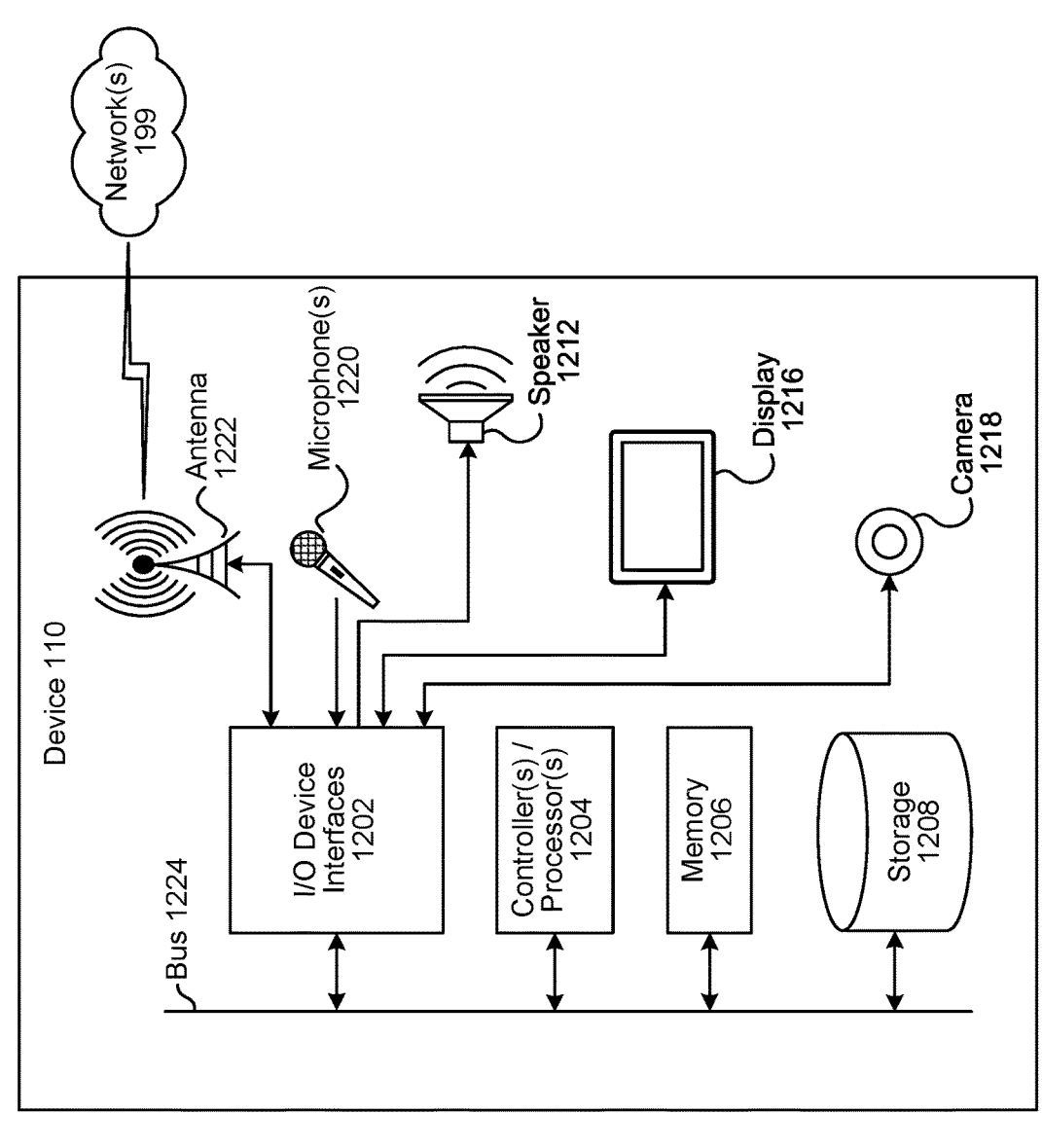
FIG. 12 is a block diagram conceptually illustrating example components of a device, according to embodiments of the present disclosure.

FIG. 12 is a block diagram conceptually illustrating a device 110 that may be used with the system. FIG. 13 is a block diagram conceptually illustrating example components of a remote device, such as the natural language command processing system component 1120, which may assist with ASR processing, NLU processing, etc., and a skill system component 1125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component 1120 may be located remotely from the device 110 as its operations may not require proximity to the user. The server/system component 1120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting component 1120 may also be a version of a user device 110 that includes different (e.g., more) processing capabilities than other user device(s) 110 in a home/office. One benefit to the server/system component 1120 being in a user's home/business is that data used to process a command/return a response may be kept within the user's home, thus reducing potential privacy concerns.

Multiple systems (120/125) may be included in the overall system 100 of the present disclosure, such as one or more natural language processing system components 1120 for performing ASR processing, one or more natural language processing system components 1120 for performing NLU processing, one or more skill system components 1125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system component 1120, or a skill system component 1125 may include their own dedicated processors, memory, and/or storage. Alternatively, one or more of the components of the device(s) 110, the natural language command processing system component 1120, or a skill system component 1125 may utilize the I/O interfaces (1202/1302), processor(s) (1204/1304), memory (1206/1306), and/or storage (1208/1308) of the device(s) 110, natural language command processing system component 1120, or the skill system component 1125, respectively. Thus, the ASR component 150 may have its own I/O interface(s), processor(s), memory, and/or storage; the NLU component 1160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component 1120, and a skill system component 1125, as described herein, are illustrative, and may be located as a stand-alone device or may be included, in whole or in part, as a component of a larger device or system. As can be appreciated, a number of components may exist either on a system component 1120 and/or on device 110. For example, the language processing components 1192 (which may include the ASR component 150 and the NLU component 1160), the language output components 1193 (which may include the NLG component 1179 and the TTS component 1180), etc. Unless expressly noted otherwise, the system version of such components may operate similarly to the device version of such components and thus the description of one version (e.g., the system version or the local version) applies to the description of the other version (e.g., the local version or system version) and vice-versa.

Figure 14:
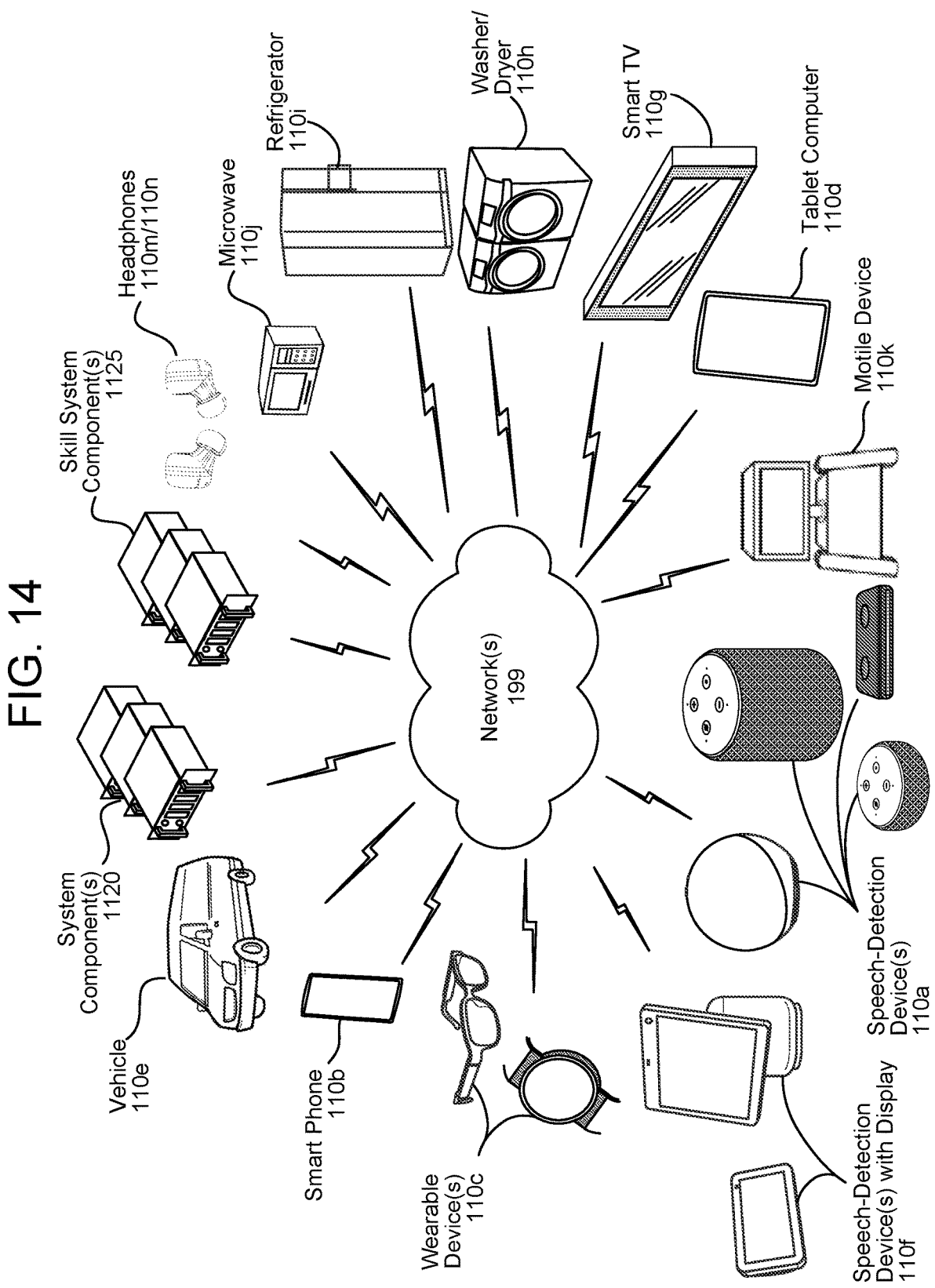
FIG. 14 illustrates an example of a computer network for use with the overall system, according to embodiments of the present disclosure.

As illustrated in FIG. 14, multiple devices (110a-110n, 1120, 1125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a wearable device 110c (e.g., smart watch or smart glasses), a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component 1120, the skill system component(s) 1125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 1160, etc. of the natural language command processing system component 1120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first audio data representing first speech spoken by a first speaker in a source language, the first speech to be translated into synthesized speech in a target language different from the source language;

receiving first speaker embedding data representing first voice identity characteristics of a second speaker different from the first speaker;

processing the first audio data using a first encoder to generate first vocal performance embedding data representing first vocal performance characteristics of the first speech;

receiving first data representing a first transcript of the first speech in the source language;

performing machine translation of the first data to generate second data representing a second transcript in the target language, the second transcript corresponding to a translation of the first transcript;

receiving language embedding data representing language-dependent speech characteristics of the target language;

generating, using a second encoder, the first vocal performance embedding data, the language embedding data, and the second data, first transcript embedding data corresponding to the second transcript in the target language and the first vocal performance characteristics;

processing the first speaker embedding data and the first transcript embedding data using a first neural network to generate first acoustic embedding data corresponding to the synthesized speech, the first vocal performance characteristics, and the first voice identity characteristics, the first neural network implementing a first transformation representing an inverse of a second transformation implemented by a second neural network trained to suppress voice identity characteristics; and processing the first acoustic embedding data using a decoder and the first speaker embedding data to generate second audio data representing the synthesized speech in the target language, the synthesized speech having the first voice identity characteristics and the first vocal performance characteristics.

2. The computer-implemented method of claim 1, further comprising:

receiving third audio data representing sample speech from a training dataset;

processing the third audio data using a third encoder to generate second speaker embedding data representing second voice identity characteristics of a third speaker of the sample speech;

processing the third audio data using a fourth encoder and the second speaker embedding data to generate second acoustic embedding data representing the sample speech with the second voice identity characteristics retained;

processing the second acoustic embedding data using a third neural network and the second speaker embedding data to generate third data representing the sample speech with the second voice identity characteristics suppressed;

determining fourth data representing a third transcript of the sample speech; and training the third neural network using the third data and the fourth data to determine the second neural network, the second neural network representing an updated version of the third neural network.

3. The computer-implemented method of claim 1, further comprising:

processing the first audio data using a first component to generate third audio data representing the first audio data with at least a portion of noise content removed;

processing the third audio data using the first encoder to generate second vocal performance embedding data;

processing fourth audio data using the first component to generate fifth audio data representing a noise content of the fourth audio data, the fourth audio data representing speech recorded in a low-noise environment;

processing the fifth audio data using a third encoder to generate noise embedding data; and determining the first vocal performance embedding data using the second vocal performance embedding data and the noise embedding data.

4. The computer-implemented method of claim 1, further comprising:

determining that the second data corresponds to a first duration;

receiving duration data indicating that the first speech corresponds to a second duration different from the first duration; and generating, using the first transcript embedding data and the duration data, second transcript embedding data corresponding to the second duration, wherein generating the first acoustic embedding data includes processing the second transcript embedding data using the first neural network.

5. A computer-implemented method comprising:

receiving first audio data representing first speech in a first language;

receiving first data representing first voice identity characteristics for synthesizing second speech;

determining, using the first audio data, second data representing vocal performance characteristics of the first speech;

receiving third data representing a transcript of the second speech in a target language, the second speech representing a translation of the first speech;

determining, using the third data and the second data, fourth data representing transcript embeddings corresponding to the transcript of the second speech and the vocal performance characteristics of the first speech;

processing the fourth data and the first data using a first neural network to generate fifth data representing acoustic embeddings corresponding to the second speech, the vocal performance characteristics, and the first voice identity characteristics, the first neural network implementing a first transformation representing an inverse of a second transformation trained to suppress voice identity characteristics; and processing the fifth data using a decoder to determine second audio data representing the second speech, the second speech having the first voice identity characteristics and the vocal performance characteristics.

6. The computer-implemented method of claim 5, further comprising:

receiving third audio data representing third speech;

determining first embedding data representing second voice identity characteristics of the third speech;

determining, using the third audio data and the first embedding data, second embedding data representing the third speech and the second voice identity characteristics;

processing the second embedding data using a third transformation and the first embedding data to generate third embedding data representing the third speech with the second voice identity characteristics suppressed;

determining fifth data representing a transcript of the third speech;

training the third transformation using the third embedding data and the fifth data to determine the second transformation, the second transformation representing an updated version of the third transformation; and determining the first transformation using the second transformation.

7. The computer-implemented method of claim 5, further comprising:

processing the first audio data using a first component to generate third audio data representing the first audio data with at least a portion of noise content removed;

determining, using the third audio data, fifth data representing second vocal performance characteristics of the first speech;

receiving fourth audio data representing a speech recorded in a low-noise environment;

processing the fourth audio data using the first component to generate fifth audio data representing a noise content of the fourth audio data;

determining, using the fifth audio data, sixth data representing a noise embedding; and determining the second data using the fifth data and the sixth data.

8. The computer-implemented method of claim 5, further comprising:

determining that the third data corresponds to a first duration; and receiving duration data indicating that the first speech corresponds to a second duration different from the first duration, wherein generating the fourth data includes generating the fourth data to correspond to the second duration.

9. The computer-implemented method of claim 5, further comprising:

processing the first audio data to determine fifth data representing a transcript of the first speech;

performing machine translation of the fifth data to generate sixth data representing a translation of the first speech into the target language; and performing grapheme-to-phoneme processing of the sixth data to determine the third data.

10. The computer-implemented method of claim 5, further comprising:

receiving embedding data representing speech characteristics corresponding to the target language, wherein determining the fourth data includes using the embedding data and the fourth data additionally corresponds to the speech characteristics of the target language.

11. The computer-implemented method of claim 5, further comprising:

receiving first multimedia content including video data and the first audio data;

determining first timing data representing a first temporal alignment between the first audio data and the video data;

determining, using the first timing data, second timing data representing a second temporal alignment between the second audio data and the video data; and generating, using the second timing data, the video data, and the second audio data, second media content representing the video data dubbed with the second audio data.

12. The computer-implemented method of claim 5, further comprising:

receiving third audio data representing a plurality of speech samples;

processing the third audio data using an encoder to determine sixth embedding data representing a distribution of representations the plurality of speech samples in a latent space;

processing the sixth embedding data using the decoder to generate fourth audio data representing a reconstruction of the plurality of speech samples;

determining, using the sixth embedding data, a regularization loss term;

determining, using the fourth audio data, a reconstruction loss term; and training the encoder and the decoder using the regularization loss term and the reconstruction loss term.

13. A system, comprising:

at least one processor; and at least one memory comprising instructions that, when executed by the at least one processor, cause the system to:

receive first audio data representing first speech in a first language;

receive first data representing first voice identity characteristics for synthesizing second speech;

determine, using the first audio data, second data representing vocal performance characteristics of the first speech;

receive third data representing a transcript of the second speech in a target language, the second speech representing a translation of the first speech;

determine, using the third data and the second data, fourth data representing transcript embeddings corresponding to the transcript of the second speech and the vocal performance characteristics of the first speech;

process the fourth data and the first data using a first neural network to generate fifth data representing acoustic embeddings corresponding to the second speech, the vocal performance characteristics, and the first voice identity characteristics, the first neural network implementing a first transformation representing an inverse of a second transformation trained to suppress voice identity characteristics; and process the fifth data using a decoder to determine second audio data representing the second speech, the second speech having the first voice identity characteristics and the vocal performance characteristics.

14. The system of claim 13, wherein the at least one memory further comprises instructions that, when executed by the at least one processor, further cause the system to:

receive third audio data representing third speech;

determine first embedding data representing second voice identity characteristics of the third speech;

determine, using the third audio data and the first embedding data, second embedding data representing the third speech and the second voice identity characteristics;

process the second embedding data using a third transformation and the first embedding data to generate third embedding data representing the third speech with the second voice identity characteristics suppressed;

determine fifth data representing a transcript of the third speech;

train the third transformation using the third embedding data and the fifth data to determine the second transformation, the second transformation representing an updated version of the third transformation; and determine the first transformation using the second transformation.

15. The system of claim 13, wherein the at least one memory further comprises instructions that, when executed by the at least one processor, further cause the system to:

process the first audio data using a first component to generate third audio data representing the first audio data with at least a portion of noise content removed;

determine, using the third audio data, fifth data representing second vocal performance characteristics of the first speech;

receive fourth audio data representing a speech recorded in a low-noise environment;

process the fourth audio data using the first component to generate fifth audio data representing a noise content of the fourth audio data;

determine, using the fifth audio data, sixth data representing a noise embedding; and determine the second data using the fifth data and the sixth data.

16. The system of claim 13, wherein the at least one memory further comprises instructions that, when executed by the at least one processor, further cause the system to:

determine that the third data corresponds to a first duration; and receive duration data indicating that the first speech corresponds to a second duration different from the first duration, wherein generating the fourth data includes generating the fourth data to correspond to the second duration.

17. The system of claim 13, wherein the at least one memory further comprises instructions that, when executed by the at least one processor, further cause the system to:

process the first audio data to determine fifth data representing a transcript of the first speech;

perform machine translation of the fifth data to generate sixth data representing a translation of the first speech into the target language; and perform grapheme-to-phoneme processing of the sixth data to determine third first data.

18. The system of claim 13, wherein the at least one memory further comprises instructions that, when executed by the at least one processor, further cause the system to:

receive embedding data representing speech characteristics corresponding to the target language, wherein determining the fourth data includes using the embedding data and the fourth data additionally corresponds to the speech characteristics of the target language.

19. The system of claim 13, wherein the at least one memory further comprises instructions that, when executed by the at least one processor, further cause the system to:

receive first multimedia content including video data and the first audio data;

determine first timing data representing a first temporal alignment between the first audio data and the video data;

determine, using the first timing data, second timing data representing a second temporal alignment between the second audio data and the video data; and generate, using the second timing data, the video data, and the second audio data, second media content representing the video data dubbed with the second audio data.

20. The system of claim 13, wherein the at least one memory further comprises instructions that, when executed by the at least one processor, further cause the system to:

receive third audio data representing a plurality of speech samples;

process the third audio data using an encoder to determine sixth embedding data representing a distribution of representations the plurality of speech samples in a latent space;

process the sixth embedding data using the decoder to generate fourth audio data representing a reconstruction of the plurality of speech samples;

determine, using the sixth embedding data, a regularization loss term;

determine, using the fourth audio data, a reconstruction loss term; and train the encoder and the decoder using the regularization loss term and the reconstruction loss term.

* * * * *